(12) United States Patent
Bohlke et al.

(10) Patent No.: US 7,762,602 B2
(45) Date of Patent: Jul. 27, 2010

(54) DEVICE FOR STORING OBJECTS IN A MOTOR VEHICLE

(75) Inventors: Hartmut Bohlke, Wuppertal (DE); Andreas Goebbels, Kuerten (DE); Jüergen Salewski, Duesseldorf (DE); Wolfgang Sitzler, Wuppertal (DE); Olaf Bueschgens, Willich (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 12/283,467

(22) Filed: Sep. 12, 2008

(65) Prior Publication Data

US 2009/0072567 A1 Mar. 19, 2009

(30) Foreign Application Priority Data

Sep. 13, 2007 (DE) .................... 10 2007 045 037

(51) Int. Cl.
*B60R 7/04* (2006.01)
(52) U.S. Cl. .................................. 296/37.16
(58) Field of Classification Search ................ 296/24.4, 296/24.43, 37.8, 37.16, 98; 160/120; 224/311, 224/314, 318, 320
See application file for complete search history.

(56) References Cited

U.S. PATENT DOCUMENTS

| | | | | |
|---|---|---|---|---|
| 4,502,674 A | * | 3/1985 | White et al. | 296/37.16 |
| 5,207,260 A | * | 5/1993 | Commesso | 160/135 |
| 5,971,433 A | * | 10/1999 | Ament et al. | 280/749 |
| 6,390,526 B1 | * | 5/2002 | Ament et al. | 296/37.16 |

(Continued)

FOREIGN PATENT DOCUMENTS

DE 10 2006 006 665 A1 8/2001

(Continued)

OTHER PUBLICATIONS

European Patent Office Search Report dated Jan. 20, 2009 (6 pages).
Office Action of German Patent Office dated Feb. 18, 2008 (4 pages).

*Primary Examiner*—Glenn Dayoan
*Assistant Examiner*—Gregory Blankenship
(74) *Attorney, Agent, or Firm*—Flynn, Thiel, Boutell & Tanis, P.C.

(57) ABSTRACT

The invention relates to a device for storing objects in a loading space (11) of a motor vehicle (1, 101) having a storage container (2, 702, 802) which can be attached to the loading space (11) of the motor vehicle, wherein the storage container (2, 702, 802) has a supporting surface (21, 821) and a wall (20) which can deform at least partially elastically and/or inelastically, characterized in that in order to change the volume of a storage compartment a height of the wall (20) can be changed at least in certain sections by an adjustment device comprising at least one winding shaft (61, 61*a*, 61*b*, 61*c*, 61*d*), the adjustment device has at least one detachable securing device (8, 108, 208, 308, 408), and a rotational movement of the at least one winding shaft (61, 61*a*, 61*b*, 61*c*, 61*d*) can be locked by means of the detachable securing device for the purpose of transportation, with the result that at least a lengthening of the wall (20) is prevented during transportation, and/or the adjustment device comprises an extension-limiting device (9, 408, 509) which limits a maximum extension movement of the at least one winding shaft (61, 61*a*, 61*b*, 61*c*, 61*d*).

28 Claims, 15 Drawing Sheets

U.S. PATENT DOCUMENTS

| | | | |
|---|---|---|---|
| 6,439,633 B2 * | 8/2002 | Nemoto | 296/37.14 |
| 6,598,921 B2 * | 7/2003 | Seel et al. | 296/24.43 |
| 6,715,525 B2 * | 4/2004 | Ehrenberger et al. | 160/23.1 |
| 7,048,319 B2 * | 5/2006 | Ament et al. | 296/37.16 |
| 7,121,601 B2 * | 10/2006 | Mulvihill et al. | 296/24.33 |
| 7,255,382 B2 * | 8/2007 | Ament et al. | 296/37.16 |
| 7,318,617 B1 * | 1/2008 | Scotton | 296/37.16 |
| 7,537,257 B2 * | 5/2009 | Watanabe et al. | 296/24.46 |
| 2001/0040382 A1 * | 11/2001 | Nemoto | 296/37.14 |
| 2002/0000734 A1 * | 1/2002 | Bharj et al. | 296/37.16 |
| 2002/0163220 A1 * | 11/2002 | Ament et al. | 296/37.16 |
| 2006/0208518 A1 * | 9/2006 | Ament et al. | 296/37.16 |
| 2007/0164581 A1 * | 7/2007 | Ehrenberger | 296/37.16 |
| 2009/0167043 A1 * | 7/2009 | Aebker | 296/37.16 |

FOREIGN PATENT DOCUMENTS

| | | |
|---|---|---|
| DE | 101 17 837 A1 | 1/2002 |
| DE | 103 32 983 A1 | 2/2005 |
| DE | 103 48 890 A1 | 5/2005 |
| DE | 10 2005 051 732 A1 | 5/2007 |
| DE | 10 2006 013 974 A1 | 9/2007 |
| EP | 0 914 989 A2 | 5/1999 |
| EP | 1 717 104 A1 | 11/2006 |
| FR | 2 876 641 | 4/2006 |
| JP | 60-222339 | 11/1985 |

* cited by examiner

DEVICE FOR STORING OBJECTS IN A MOTOR VEHICLE

FIELD OF THE INVENTION

The invention relates to a device for storing objects in a loading space, in particular in a rear loading space or trunk, of a motor vehicle.

BACKGROUND OF THE INVENTION

Storage containers in which relatively small or fragile objects can be stored in a loading space of a motor vehicle in a clearly organized and safe fashion are generally known. In particular in relatively large limousines and similar classes of vehicle a (rear) loading space has a large extent, in particular also a large depth, which is not suitable to the same degree for all objects. Storage containers which are arranged in the loading space and which have the purpose of storing relatively small and/or sensitive objects can significantly increase the useful value of the loading space here.

Such storage containers are attached in a displaceable fashion, for example, on the underside of a rear tray in a storage position, and for the purpose of loading or unloading they can be extended into a loading or unloading position. The storage containers are generally used only for a certain time or temporarily.

The unpublished document DE 10 2006 013974.7 discloses a storage container for use in a loading space of a motor vehicle which can be attached to the underside of a rear tray, and for the purpose of loading or unloading can be moved into a loading and/or unloading position, wherein the storage container comprises a frame, a supporting surface and at least one essentially inelastic side wall which connects the supporting surface to the frame, and wherein the side wall is deformable with the result that the height of the storage container can be varied. The side wall is formed here in one refinement by means of a plurality of roller blinds which are each attached in such a way that they can be wound onto and unwound from a winding shaft.

An object of the invention is to increase the safety of a corresponding storage container.

This object is achieved by means of a device for storing objects in a loading space of a motor vehicle having a storage container which can be attached to the loading space of the motor vehicle, wherein the storage container has a supporting surface and a wall which can deform at least partially elastically and/or inelastically, and in order to change the volume of a storage compartment a height of the wall can be changed at least in certain sections by an adjustment device comprising at least one winding shaft, the adjustment device has at least one detachable securing device, and a rotational movement of the at least one winding shaft can be locked by means of the detachable securing device for the purpose of transportation, with the result that at least a lengthening of the wall is prevented during transportation.

The height of the wall is dependent, for example, on the weight of an object which is accommodated by the storage container. During travel, in particular in the event of shocks or vibrations to the motor vehicle due to unevenness of an underlying surface, corrugations in the ground or in the event of extreme braking interventions and/or acceleration interventions, forces which lead to lengthening of the wall may act on the storage container. According to the invention, a securing device reliably prevents a rotational movement of the winding shaft, and therefore prevents undesired lengthening.

In one advantageous refinement of the invention, the securing device comprises at least one damping element for cushioning load peaks. The damping element absorbs forces acting due to strong shocks, for example as a result of corrugations in the ground, and therefore prevents acting forces resulting in damage to the components.

In a further refinement of the invention, the securing device comprises at least one beveled ratchet wheel which engages in a complementary beveled wheel which is arranged in a rotationally fixed fashion on the winding shaft, in order to block the rotational movement of the winding shaft. By pressing the beveled wheel, which is provided on the winding shaft, against the beveled ratchet wheel, the rotational movement of the winding shaft is blocked. If two teeth of the beveled wheels strike against one another when the beveled wheel is pressed against the beveled ratchet wheel, in one embodiment the winding shaft is rotated slightly during the pressing process with the result that the teeth of the beveled wheel of the winding shaft come to rest in corresponding intermediate tooth spaces of the beveled wheel on the vehicle, and vice versa. In one advantageous refinement, the axes of the beveled wheels are arranged essentially perpendicular to one another in this context.

In one development of the invention, the beveled ratchet wheel is arranged in a rotationally fixed and axially displaceable fashion on a second winding shaft opposite a beveled wheel which is connected in a rotationally fixed fashion to the second winding shaft. Displacing the beveled ratchet wheel in the direction of the beveled wheel of the second winding shaft causes the beveled wheel of the first winding shaft to be clamped between the beveled ratchet wheel and the beveled wheel of the second winding shaft with the result that the first winding shaft and the second winding shaft are prevented from rotating. In one refinement, the beveled wheels of the first and second winding shafts are arranged in such a way that movement of the winding shafts is synchronized. In one embodiment, a displacement of the beveled ratchet wheel in order to clamp the beveled wheel of the first winding shaft occurs counter to the force of a force element, in particular counter to the force of a spring. In this context, in an unloaded state the force element prevents the rotational movement from being undesirably locked. The spring element is preferably arranged coaxially to the displacement direction of the beveled ratchet wheel in this context.

In one development, the damping element is a damper, in particular a rubber damper, which is arranged between the beveled ratchet wheel and the beveled wheel of the second winding shaft. A corresponding damping element prevents load peaks which act on the storage container due, for example, to shocks resulting from corrugations in the ground or the like from being absorbed by the teeth of the beveled wheels.

In another refinement of the invention, the securing device comprises an arbor which is mounted on the vehicle in an essentially rotationally fixed fashion and which can be introduced into a pitch circle which is arranged in a rotationally fixed fashion on the winding shaft, in order to block the rotational movement of the winding shaft. In one refinement, the pitch circle is arranged in such a way that the holes are distributed in the circumferential direction. A grid of the pitch circle is preferably regular here. In one advantageous refinement, the arbor is mounted fixed to the vehicle so as to be axially displaceable counter to the force of a restoring element. If, in a corresponding refinement, the arbor does not directly coincide with a hole in the pitch circle when the insertion process is carried out, the arbor is displaced or pressed in through the pitch circle. If the winding shaft rotates owing to a shock or the like, the arbor latches into the adjacent or subsequent hole owing to the force of the restoring element.

In yet another refinement of the invention, the securing device comprises an arbor which is mounted on the vehicle in an essentially rotationally fixed fashion and has an at least partially non-rotationally symmetrical outer contour and which can be introduced into a complementary cutout on the winding shaft extending in the axial direction, in order to block the rotational movement of the winding shaft. A rotational movement of a coaxially arranged winding shaft can easily be blocked by means of the arbor.

In one development of the invention, the damping element of the securing device is part of the mount for the arbor on the vehicle. The load peaks which occur owing to shocks can as a result be essentially absorbed before they act on the storage container.

In one refinement of the invention, the storage container in the vehicle can be mounted in such a way that it can be displaced along a plane which is essentially parallel to the floor of the vehicle, in particular in the longitudinal direction of the vehicle, wherein by displacing the storage container into a storage position the winding shaft is blocked by the securing device on the vehicle. In one refinement of the invention, through displacement the arbor is inserted into the pitch circle and/or into the cutout on the winding shaft. In another refinement, pushing the storage container into the storage position presses the beveled ratchet wheel against the beveled wheel of the first winding shaft in order to prevent the rotational movement. In both refinements, the user can carry out a simple locking process during the pushing in operation without further maneuvers. For displaceable mounting, in one refinement the storage container has a rail guide, in particular a telescopic rail guide or a cage rail guide.

The object is also achieved by means of an extension-limiting device which limits the maximum extension movement of the winding shaft. In particular when relatively heavy objects are placed in the storage container, the volume of a storage compartment can be increased greatly owing to the acting weight. In order to prevent the resulting acting forces being absorbed at a connection of the wall to the winding shaft, the invention provides an extension-limiting device. In one refinement of the invention, the extension-limiting device comprises at least two intermeshing gearwheels which are connected to one another by means of an elongate element such as a cable, a belt or the like, in particular a flat belt, wherein the maximum extension movement is determined by the length of the elongate element. In one refinement, the belt is at least partially resilient with the result that the belt dampens the movement at the end points of the movement.

In another refinement of the invention, the extension-limiting device comprises a transmission having at least two, in particular three, intermeshing gearwheels, wherein a rotational angle of at least one gearwheel is limited by a stop. The movement-limiting means of one of the gearwheels of the transmission also blocks a movement of the remaining gearwheels of the transmission. Suitable transmission ratios between the gearwheels make it possible here for a gearwheel of the transmission which is connected directly to the winding shaft in a rotationally fixed fashion to carry out a plurality of revolutions, while a gearwheel which interacts directly with the stop carries out less than one full revolution, for example only a ¾ revolution or less. The teeth of the transmission permits a certain degree of damping of acting forces to be achieved here. In another refinement, the stop is configured with a damping element.

In yet another refinement of the invention, the extension-limiting device comprises a Maltese cross transmission having a spigot. The spigot permits here a rotational movement of the winding shaft in the extension direction and/or winding-on direction to be prevented. Depending on the configuration of the spigot and/or an associated stop, damping can be implemented when the components strike one another.

In a development of the invention, the at least one winding shaft has a winding spring, wherein the wall is lengthened counter to the force of the winding spring. The winding spring, for example a customary spring storage arrangement, permits the storage container to be easily reduced in size when not in use. In this context, no further attachment means are required to clamp the storage container. However, in individual applications additional attachment means may be appropriate.

In one refinement of the invention, a brake device is provided which acts counter to a force of the winding spring in order to brake a rotational movement of the winding shaft, in particular in order to reduce or to prevent said rotational movement. This can apply to both directions of the winding shaft or just to one direction. As a result, lengthening or pulling back into the position of rest can be braked, even as far as zero. A rotational movement of the winding shaft in order to increase the volume of the storage compartment by lengthening the wall is brought about, for example, by the weight of an applied object. However, the force can also be applied by a user in a manual fashion and/or by means of an actuating device such as an electric motor. The brake device according to the invention is provided for securing the volume of the storage compartment independently of the weight of the object. In advantageous refinements, the securing device for securing a volume of the storage compartment during transportation and the brake device for defining a volume of the storage compartment are embodied separately. However, the devices can have common components. In other refinements, the devices are embodied in a common fashion. In one refinement, the brake device can be released by means of a servo-motor or the like. A silicone brake may be provided as a brake device.

In one refinement of the invention, the brake device comprises a loop brake and/or a ratchet drive. The term loop brake is used here to refer to a brake which functions by utilizing the frictional force and in which a roller or reel has a belt or the like wrapped around it. Corresponding brake devices are easy to manufacture and permit the volume of the storage compartment to be fixed in a secure fashion.

In one further refinement of the invention, the wall comprises at least one deformable surface structure which is arranged on the winding shaft in such a way that it can be wound on and unwound. The wall can comprise, for example, two side walls located opposite one another, with one side wall being rigid and the second side wall being configured as a flexible surface structure which can be wound onto or unwound from the winding shaft. Through a winding on or unwinding process it is possible here for the supporting surface to be positioned obliquely while at the same time the volume of the storage compartment is changed. In another refinement, the two side walls are configured as a common surface surface, in which case the supporting surface can be mounted in a floating fashion on the surface structure. In advantageous refinements, the wall comprises two, three or four side walls which surround a rectangular base surface. The side walls are each attached to a winding shaft here.

In one development of the invention, the surface structure is connected to the winding shaft by means of beading. The connection to the beading permits the flexible surface structure to be securely attached to the winding shaft, and in one refinement the flexible surface structure functions itself as an extension-limiting means. Alternatively, the surface structure can also be connected to the winding shaft in a materially joined fashion, in particular by bonding.

In one refinement of the invention, the device comprises at least two synchronized winding shafts which are arranged at an angle to one another, in particular at a right angle to one another, wherein a deformable surface structure is arranged such that it can be wound onto and unwound from each winding shaft. The winding shafts are synchronized here, for example by means of complementary beveled wheels. It is conceivable here, for example, that a winding shaft is driven by a servomotor, in particular by an electric motor. The movement is transmitted to the further winding shafts by the synchronization means, in particular the beveled wheels.

In a further refinement of the invention, surface structures which adjoin one another can be connected to one another by means of a re-closeable and re-openable closing element, in particular a zip fastener, wherein the closing element is closed when the surface structures are unwound.

In one refinement of the invention, a stopper is provided for limiting the opening movement of the closing element, in particular the zip fastener.

In another refinement of the invention, a holder for a zipper of a zip fastener is manufactured from a flexible material, in particular from a plastic or a wire hoop. This permits a change in the diameter of the winding shaft with the surface structure wound onto it or unwound from it to be compensated.

In a further refinement of the invention, the wall is configured such that it can be at least partially folded, wherein a mechanism for folding the wall comprises at least one linear element such as a belt, a cable or the like, which is mounted on the winding shaft. In other words, the wall is embodied as a folding bellows. A height of the wall is determined here by the free length of the linear element. Winding on the linear element permits a folding-up process.

In a further refinement of the invention, the wall comprises at least two hard shells which can be stacked one in the other, wherein a mechanism for stacking the hard shells one in the other comprises at least one linear element such as a belt, a cable or the like, which is mounted on the winding shaft. In other words, the wall is configured in a telescopic fashion, at least in certain sections. A height of the wall is determined here by the free length of the linear element.

In a further refinement of the invention, a frame of the storage container is formed at least partially by means of the at least one winding shaft.

Further advantages of the invention emerge from the following description of exemplary embodiments of the invention which are illustrated schematically in the drawings. Uniform reference symbols are used for identical or similar components in the drawings. All of the features and/or advantages which can be found in the claims, the description or the drawings, including structural details, spatial arrangements and method steps, can be essential to the invention either independently or in a wide variety of combinations. Features which are described or illustrated as part of an exemplary embodiment can likewise be used in another exemplary embodiment in order to obtain a further embodiment of the invention.

DETAILED DESCRIPTION OF THE PREFERRED EMBODIMENT

Figure 1A:
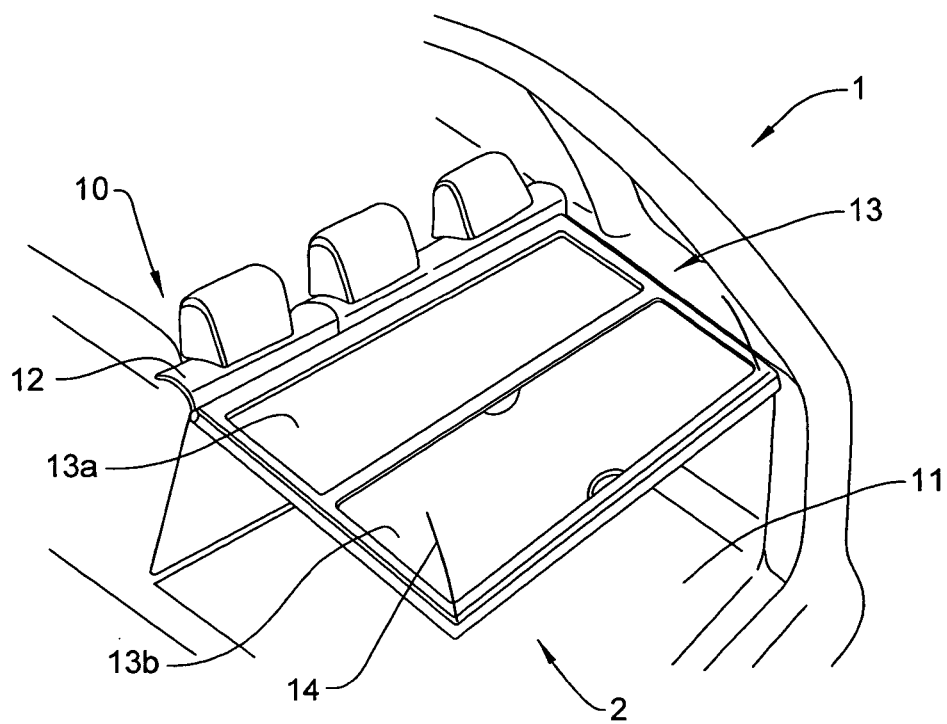
FIG. 1a is a perspective illustration of a rear of a vehicle with a device according to the invention for storing objects having a storage container.

FIGS. 1a to 1e are perspective views of the rear of a schematically illustrated vehicle 1 which has a sloping rear or fastback. A schematically indicated passenger compartment 10 of the motor vehicle 1 is separated here from a boot or rear loading space 11 by a rear seat bench 12. In order to cover the rear loading space 11, a loading space cover 13 is provided, which is connected in the illustrated exemplary embodiment to a loading space flap or rear flap (not illustrated) by means of belts 14. The loading space cover 13 is configured, for example, as a hard shell loading space cover, in which case the loading space cover 13 can both serve to conceal the objects located in the loading space 11 and can be used as a storage area. In the illustrated exemplary embodiment, the loading space cover 13 is divided into two, comprising the parts 13a, 13b. The FIGS. 1a to 1e clarify various functions of the device according to the invention.

Figure 1B:
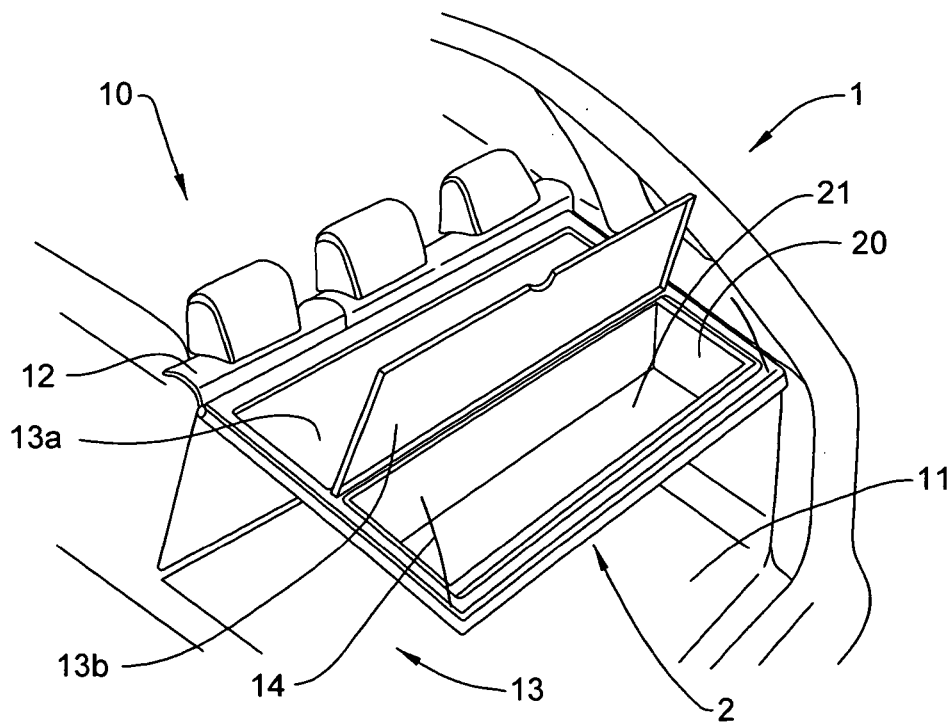
FIG. 1b is a perspective illustration of the rear of a vehicle according to FIG. 1a in which the storage container is accessible.
Figure 1C:
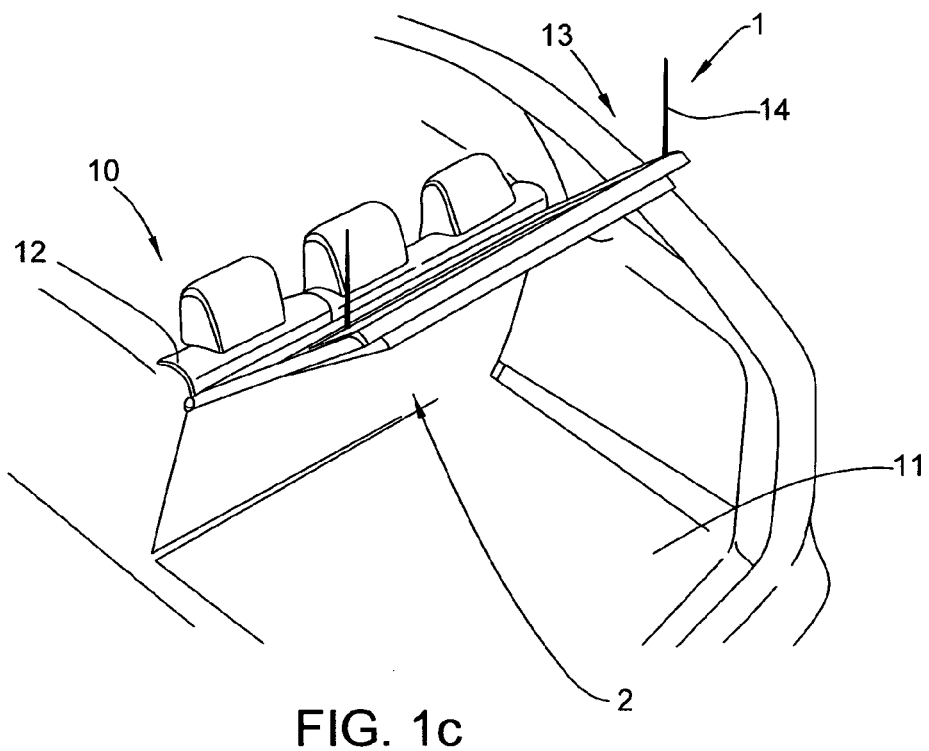
FIG. 1c is a perspective illustration of the rear of a vehicle according to FIG. 1a in which a loading space cover is folded upward and the storage container is not in use.
Figure 1D:
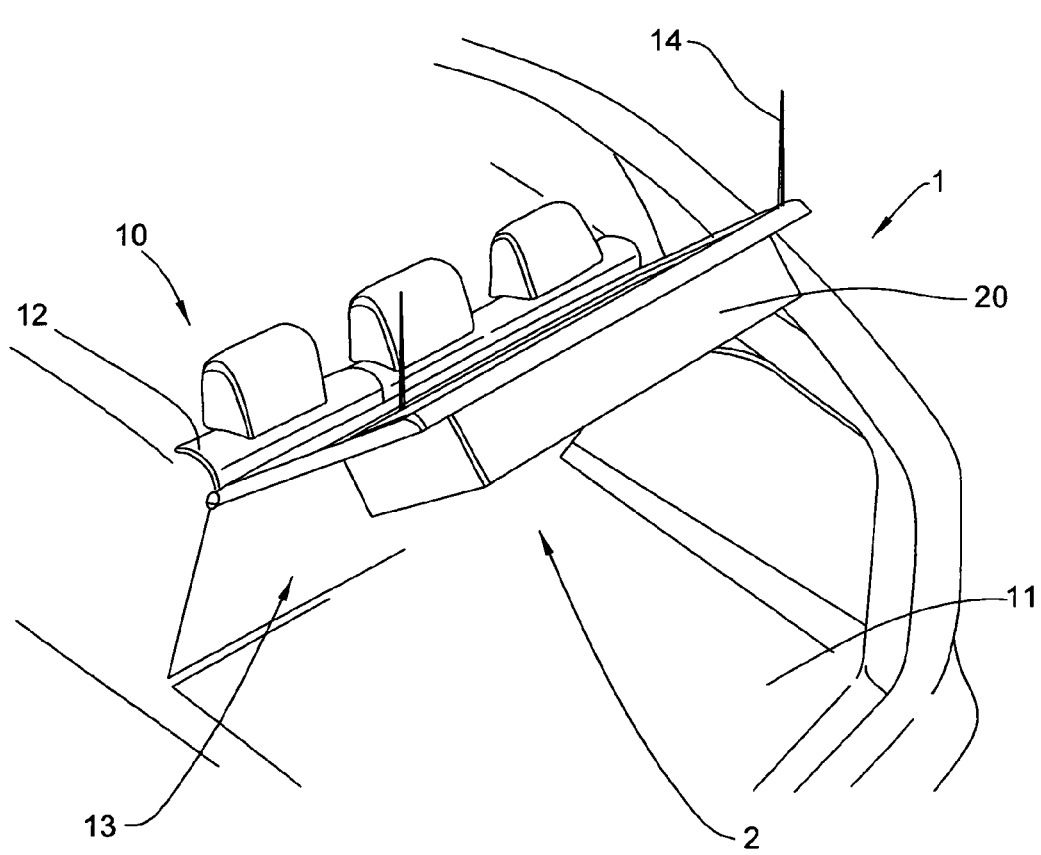
FIG. 1d is a perspective illustration of the rear of a vehicle according to FIG. 1a in which a loading space cover is folded upward and the storage container is in use.

As can be seen best in FIGS. 1b and 1d, a container 2 is mounted underneath the part 13d of the loading space cover 13 which is at the rear as seen in the direction of the vehicle. The container 2 has an essentially peripheral wall 20 and a supporting surface 21, in which case the wall 20 of the container 2 can be deformed with the result that a volume of the container 2 can be varied. As a result, as can be seen in FIG. 1c, it is possible to reduce the volume of the container 2 when it is not in use in such a way that the container 2 projects into the loading space 11 only to an insignificant degree. In order to store objects, such as for example small electric devices, briefcases, bottles or the like, the wall 20 can be lengthened so that a required volume is provided. The container 2 is therefore also referred to as a self-expanding storage compartment.

As can be seen in FIGS. 1c and 1d, in the illustrated embodiment the loading space cover 13 can pivot about an axis which is arranged at the level of the rear seat bench 12 and runs in the transverse direction of the vehicle. In this context, in the arrangement illustrated in FIGS. 1c and 1d, irrespective of its volume the container 2 is pivoted with the loading space cover 13. Objects which are arranged in the container 2 are, depending on their size, also securely mounted during the pivoting process. As is shown by the comparison of FIG. 1c and FIG. 1d, the volume of the container 2 can be reduced to a minimum by deforming the wall 20 when not in use, with the result that the container 2 projects into the loading space 11 only to an insignificant degree.

Figure 1E:
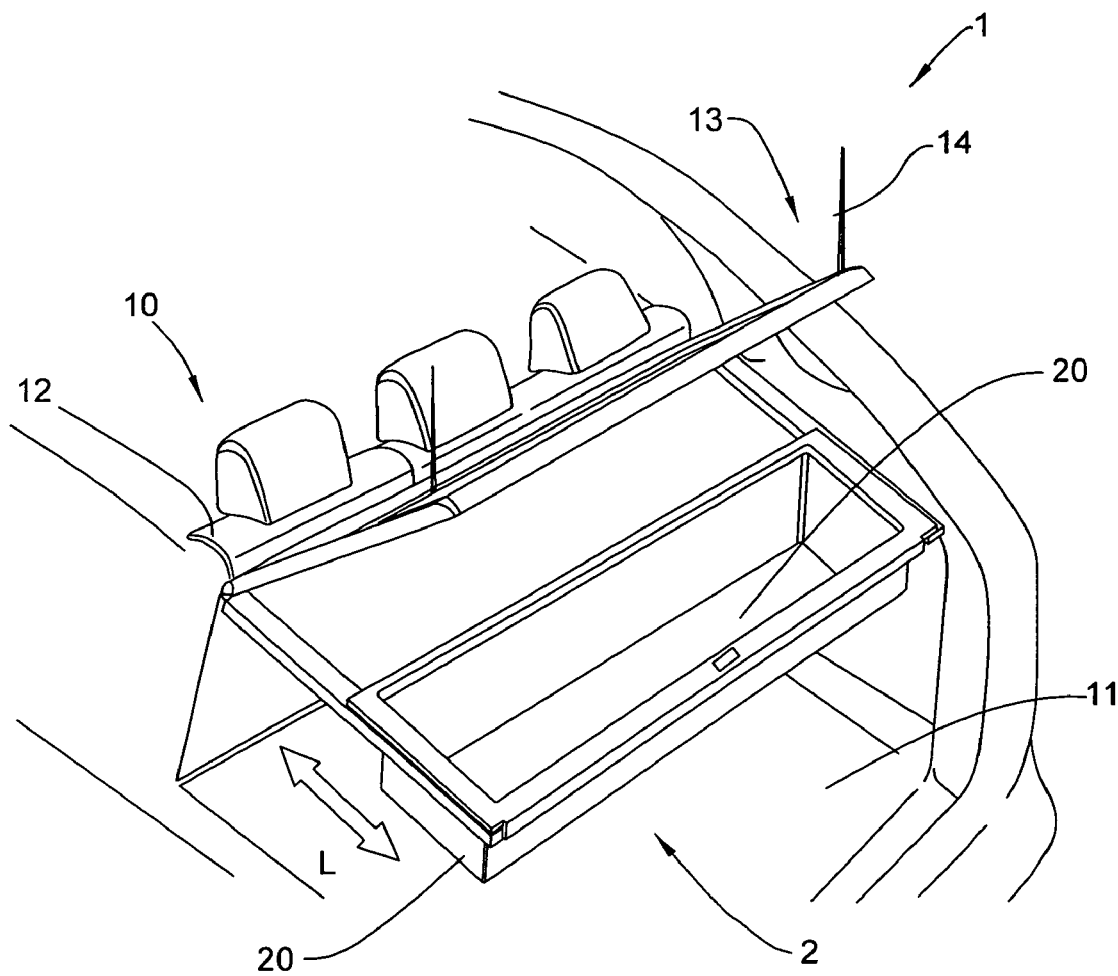
FIG. 1e is a perspective illustration of the rear of a vehicle according to FIG. 1a in which a loading space cover is folded upward and the device is accessible.

As an alternative to pivoting the container 2 with the loading space cover 13, it is also possible, as illustrated in FIG. 1e, for the container 2 not to be pivoted with the loading space cover 13. As a result, after the loading space cover 13 has been folded upward, the container 2 is accessible for loading or unloading. In the illustrated exemplary embodiment, the container 2 is additionally mounted in such a way that it can be displaced in the longitudinal direction of the vehicle, as indicated schematically by the arrow L. As a result, an arrangement of the container 2 in the loading space 11 can be optimized in accordance with a load of the loading space. Furthermore, as illustrated in FIG. 1b, the part 13b of the loading space cover 13 which is at the rear as seen in the direction of the vehicle has a lid which can be opened.

Figure 2A:
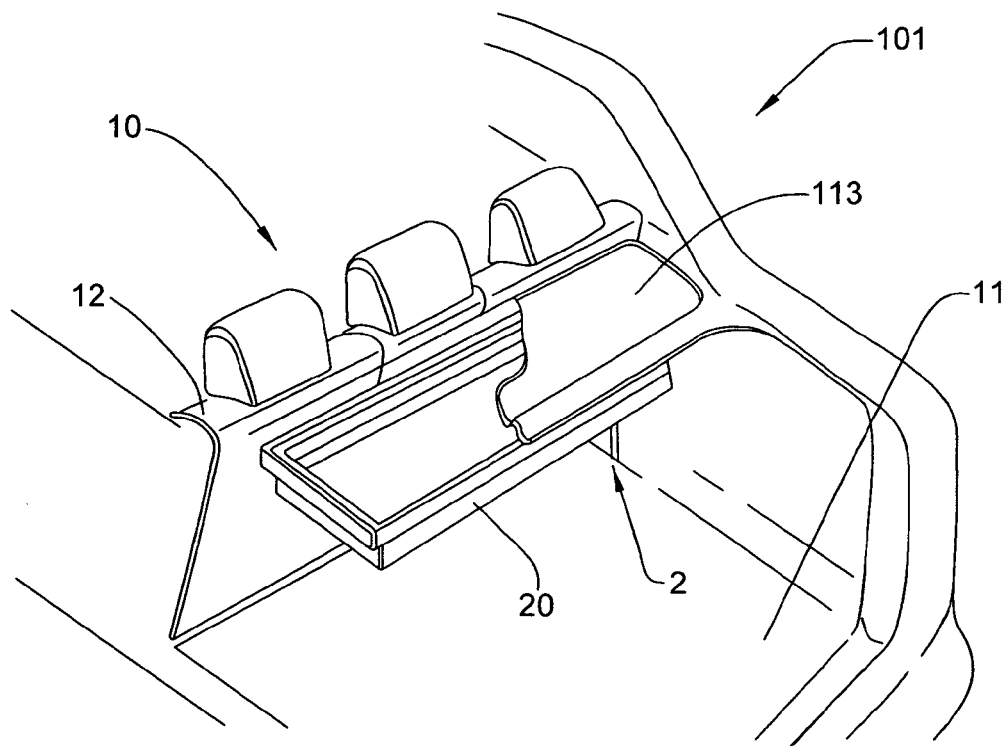
FIG. 2a is a perspective illustration of a second rear of a vehicle with a device according to the invention for storing objects having a storage container.
Figure 2B:
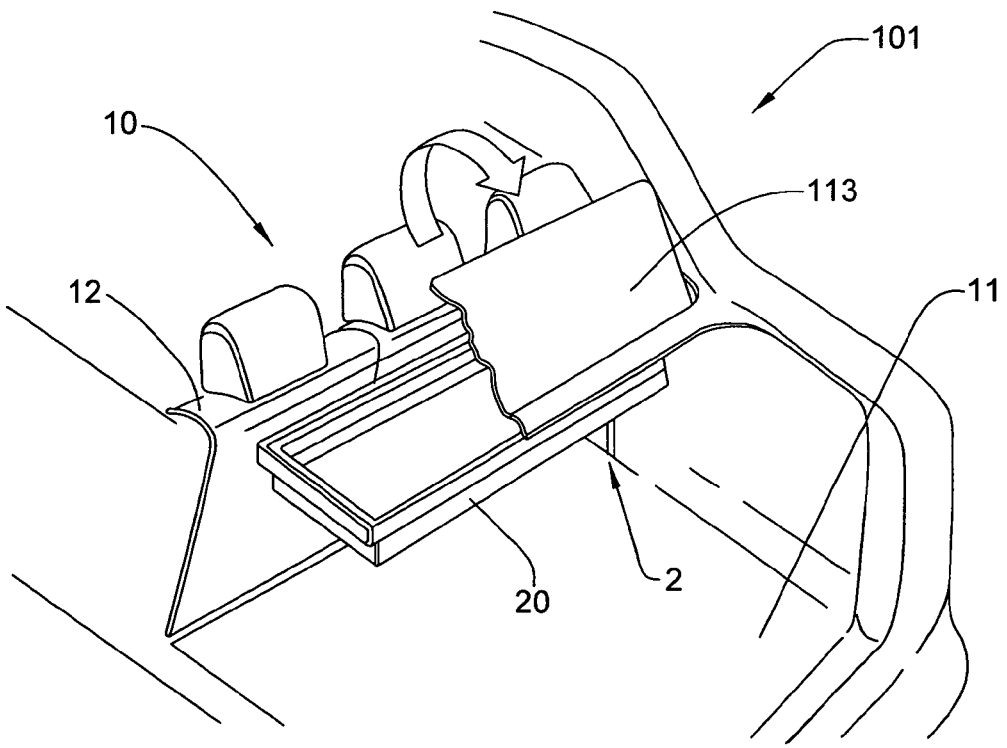
FIG. 2b is a perspective illustration of the rear of a vehicle according to FIG. 3a in which the storage container is accessible.

FIGS. 2a and 2b show a vehicle 101 with a notchback in which a container 2 is also arranged in a loading space 11. The container 2 is arranged here underneath a rear tray 113 which is accessible from the passenger compartment 10. As can be seen in FIG. 2b, the rear tray 113 can be pivoted about an axis running transversely with respect to the longitudinal axis of the vehicle, with the result that the container 2 is accessible from the passenger compartment 10. The pivoting movement is indicated in FIG. 2b by means of an arrow. Alternatively or additionally, the container 2 can also be mounted so as to be displaceable in the direction of the vehicle, with the result that the container 2 can be displaced in the direction of the rear of the vehicle for loading and/or unloading, as indicated by an arrow in FIG. 2b.

As the two examples in FIGS. 1a to 1e and FIGS. 2a, 2b show, a corresponding container 2 can be used in any desired vehicles with roller blind or hard shell loading space covers, with rear trays or the like, in which case the volume of the container 2 can be respectively optimized to demand by virtue of the deformability of the container 2.

Figure 3A:
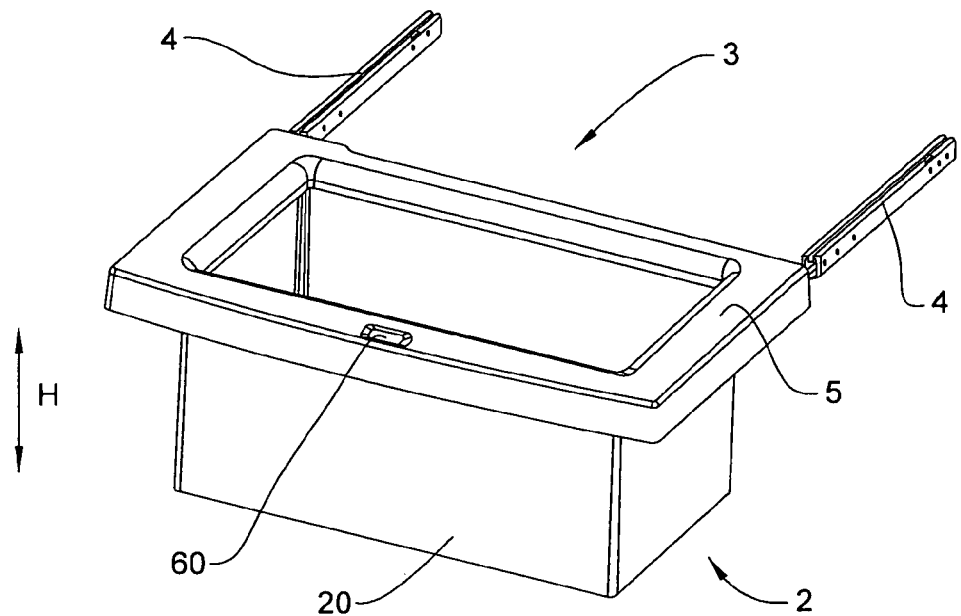
FIG. 3a is a perspective illustration of the device according to the invention.

FIG. 3a is a schematic view of a device 3 according to the invention for storing objects comprising a self-expanding container 2. The illustrated container 2 can be mounted in a displaceable fashion by means of rails 4 in a vehicle 1, 101 which is illustrated in the preceding figures. In this context, the mounting can be carried out in such a way that the container 2 can be displaced in the direction of the vehicle as in the preceding figures and/or that the container 2 can be displaced transversely with respect to the direction of the vehicle. The device 3 comprises a cover 5 by means of which an adjustment device which is concealed in FIG. 3a and has the purpose of changing the volume of the storage compartment is covered. In order to activate the adjustment device, a pushbutton 60, whose function will be described in more detail below, is provided on the cover 5.

Figure 3B:
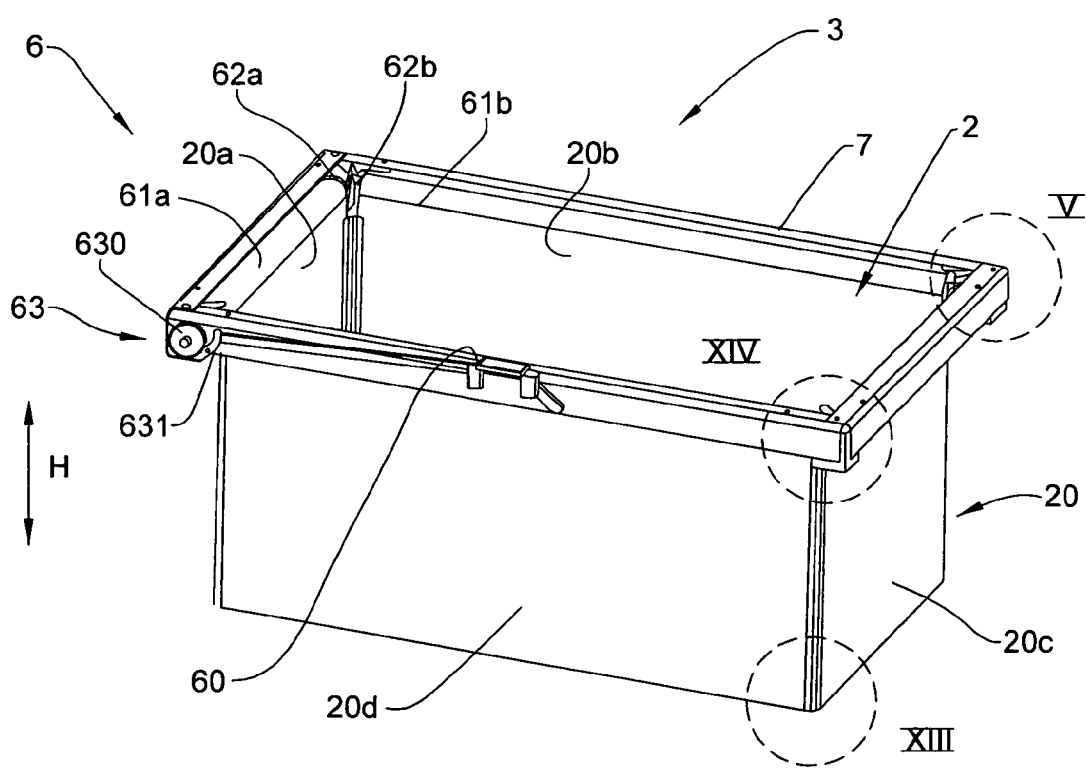
FIG. 3b is a perspective illustration of the device according to FIG. 3a in which an adjustment device can be seen.

FIG. 3b shows the device 3 according to FIG. 3a, in which case the rails 4 and the cover 5 have been removed, with the result that the adjustment device 6 for changing the height H of the container 2 can be seen. As is apparent in FIG. 3b, the adjustment device 6 of the illustrated device 3 comprises four winding shafts 61, with only two winding shafts 61a, 61b being visible in FIG. 3b. The illustrated container 2 is in the form of a parallelepiped and comprises four side walls 20a, 20b, 20c, 20d which are arranged adjacent to one another and are connected to one another at the corners. The side walls 20a, 20b, 20c, 20d are formed by flexible surface structures which are each mounted in such a way that they can be wound onto and unwound from an associated winding shaft 61a, 61b. In the illustrated exemplary embodiment, the winding shafts 61a, 61b are mounted by means of a frame 7. The winding shafts 61a, 61b are connected to one another in the illustrated exemplary embodiment at their end sides by means of beveled wheels 62a, 62b, with the result that the movement of the winding shafts 61a, 61b is synchronized. Winding on or unwinding the side walls 20a, 20b, 20c, 20d from the respective winding shafts 61a, 61b varies a height H of the wall 20 and therefore a volume of the storage compartment of the container 2. The winding shafts 61a, 61b preferably each have a winding spring (which is not illustrated and is also referred to as spring motor or spring storage arrangement), and the side walls 20a to 20d can be unwound from the respective winding shaft 61a, 61b counter to the force of the winding springs here.

Unwinding the side walls 20a to 20d from the respective winding shafts 61a, 61b is carried out, for example, by applying a force. In order to apply a force, an object (not illustrated) can, for example, be positioned in the container 2, in which case the side walls 20a to 20d are unwound from the winding shafts 61a, 61b owing to the gravity of the positioned object. In addition it is also possible for the force to be applied by a user in a manual fashion in that a floor (not visible) of the container 2 is pressed in an unwinding direction. In yet other refinements, an electrical and/or electronic drive is provided for unwinding and/or winding on the side walls 20a to 20d. In order to lock the container 2 at a desired size counter to the force of the winding springs, a retraction barrier 63 is provided. The illustrated retraction barrier 63 is configured as a ratchet drive, and in this context the retraction barrier only prevents the side walls 20a to 20d from being wound on to the associated winding shafts 61a, 61b but does not prevent unwinding. The retraction barrier 63 comprises, for this purpose, a gearwheel 630 with asymmetrical tooth edges and a detent pawl 631. The detent pawl 631 is operatively connected to the pushbutton 60. In the illustrated exemplary embodiment, the retraction barrier 63 is released by pressing the pushbutton 60. The illustrated retraction barrier 63 does not prevent the wall 20 from being lengthened.

The height H of the wall 20 of the illustrated container 2 can be varied by winding or unwinding the side walls 20a to 20d from the respective winding shafts 61a, 61b. The wall 20 of the illustrated container 2 runs around the entire periphery here. In other refinements, a storage container does not have a continuous wall. The storage container may have, for example, only two side walls which are located opposite one another, and the side walls here can be respectively wound onto a winding shaft. As a result of a synchronized rotational movement of the winding shafts, a supporting surface of the storage container is displaced in parallel here. In another refinement it is conceivable for the winding shafts which are located opposite to be moved in different ways in order to position the floor obliquely and/or for just one winding shaft to be provided for the purpose of changing the volume of a storage container.

Figure 4:
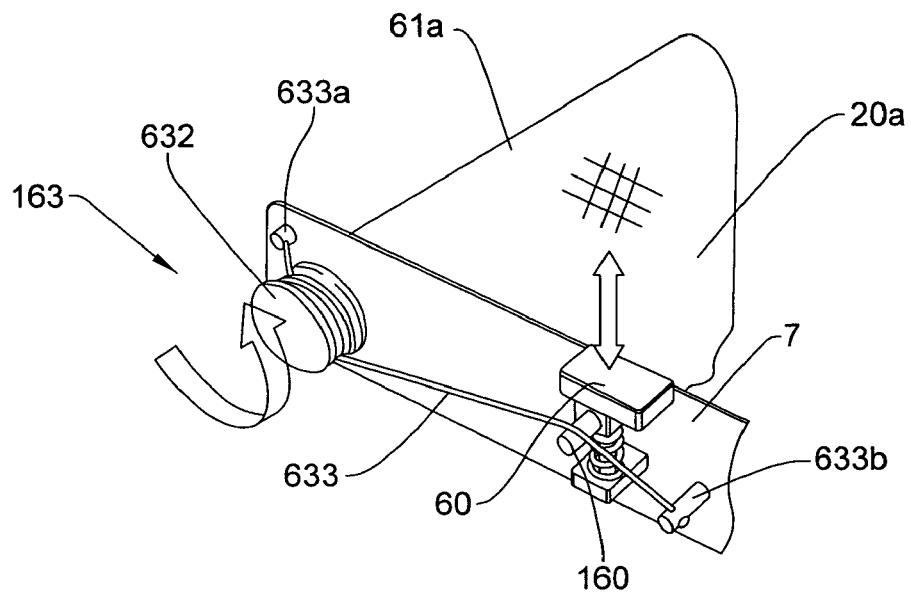
FIG. 4 shows a retraction barrier of the adjustment device.

FIG. 4 shows an alternative retraction barrier or securing device 163 with a reel 632 which is arranged coaxially with respect to the winding shaft 61a and is connected thereto in a rotationally fixed fashion. The securing device 163 which is configured as a loop brake also comprises a belt 633 which, when the reel 632 rotates, can be wound onto the reel 632 which is connected to the winding shaft 61a or is unwound from said reel 632. The belt 633 is attached to the frame 7 at attachment points 633a, 633b to the side of the reel 632, in which case the belt 633 is guided by means of a deflection pin 160 which is provided on the pushbutton 60. The belt 633 is tensioned by means of the deflection pin 160 and rotation of the reel 632 and therefore also rotation of the winding shaft 61a is prevented by virtue of the friction. By activating the pushbutton 60, the frictional force of the belt 633 at the reel 632 is reduced with the result that the winding shaft 61a can rotate, for example by virtue of the force of the winding spring (not illustrated), in order to wind the roller blind or side wall 20a.

Owing to shocks, for example due to corrugations in the ground, relatively large unevenness in an underlying surface, extremely high acceleration, braking interventions or the like, it is possible, when the invention is in use, i.e. when an object is being transported in the storage container 2, for a force to act on the winding shaft which results in lengthening of the wall 20. According to the invention, a securing device is therefore provided which can lock a rotational movement of the winding shafts 61a, 61b at least during transportation with the result that lengthening of the wall 20 is reliably prevented during transportation.

Figure 5:
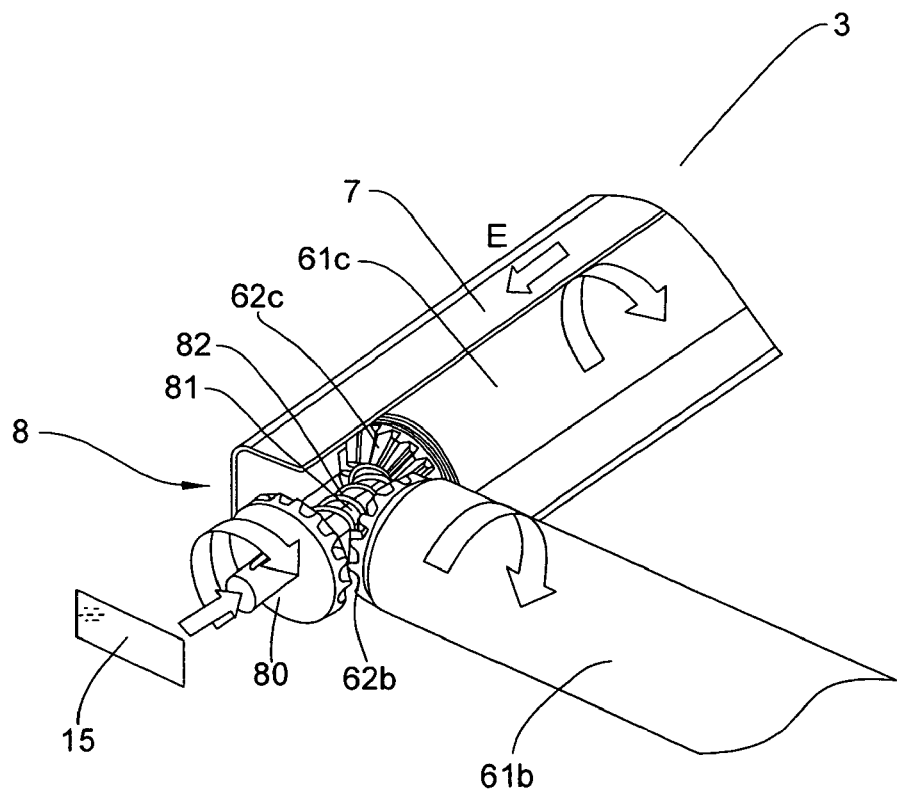
FIG. 5 shows a detail V according to FIG. 3b of a device according to a first embodiment of the invention.

FIG. 5 shows a detail V of the device 3 according to FIG. 3b in a perspective plan view of the rear wall 20b according to FIG. 3b. For the sake of better comprehension, various details in FIG. 5 are not illustrated. For example, the frame 7 for mounting the winding shafts 61b, 61c in FIG. 5 is therefore only partially illustrated. As a result, in FIG. 5 the winding shaft 61b and a winding shaft 61c which essentially adjoins it at a right angle can be seen better. The rotational directions of the winding shafts 61b, 61c are indicated by means of arrows. Beveled wheels 62b, 62c are respectively arranged at the ends of the winding shafts 61b, 61c, and here the beveled wheels 62b, 62c mesh with one another in order to synchronize the movement of the winding shafts 61b, 61c.

The securing device 8 according to the invention, by means of which a rotational movement of the winding shafts 61b, 61c can be blocked at least for transportation, comprises a beveled ratchet wheel 80 which is arranged coaxially with respect to the winding shaft 61c and is connected via a shaft 81 to the beveled wheel 62c of the winding shafts 61c in an essentially rotationally fixed and axially displaceable fashion. A spring 82 is arranged between the beveled wheel 62c and the beveled ratchet wheel 80, coaxially with respect to the shaft 81, and said spring 82 loads the beveled ratchet wheel 80 in a direction away from the beveled wheel 62c. In other words, the beveled ratchet wheel 80 and the beveled wheel 62c which is arranged coaxially thereto are kept at a distance by the spring 82. By applying a force in the axial direction of the shaft 81, the beveled ratchet wheel 80 can be displaced in the direction of the beveled wheel 62c counter to the force of the spring 82. As a result, the teeth of the beveled ratchet wheel 80 enter into engagement with the teeth of the beveled wheel 62b which is arranged between the beveled ratchet wheel 80 and the coaxial beveled wheel 62c. Since the beveled ratchet wheel 80 is connected in a rotationally fixed fashion to the beveled wheel 62c and both beveled wheels are in engagement with the beveled wheel 62b, rotation of the winding shafts 61b, 61c is therefore reliably prevented.

In one refinement, the storage container 2 is displaced, for example, in a pushing in direction E, as a result of which the beveled ratchet wheel 80 impacts against a vehicle wall 15. Through further displacement in the pushing in direction E, the beveled ratchet wheel 80 is therefore pressed through the wall 15 in the direction of the beveled wheel 62c, with the result that rotation of the winding shafts 61b, 61c and of the remaining winding shafts of the device 3 which are synchronized therewith and are not illustrated in FIG. 5 is blocked. The secured connection is released again by a movement of the storage container 2 counter to the pushing in direction E. In the process, the spring 82 presses the beveled ratchet wheel 80 away from the beveled wheel 62c again.

Figure 6:
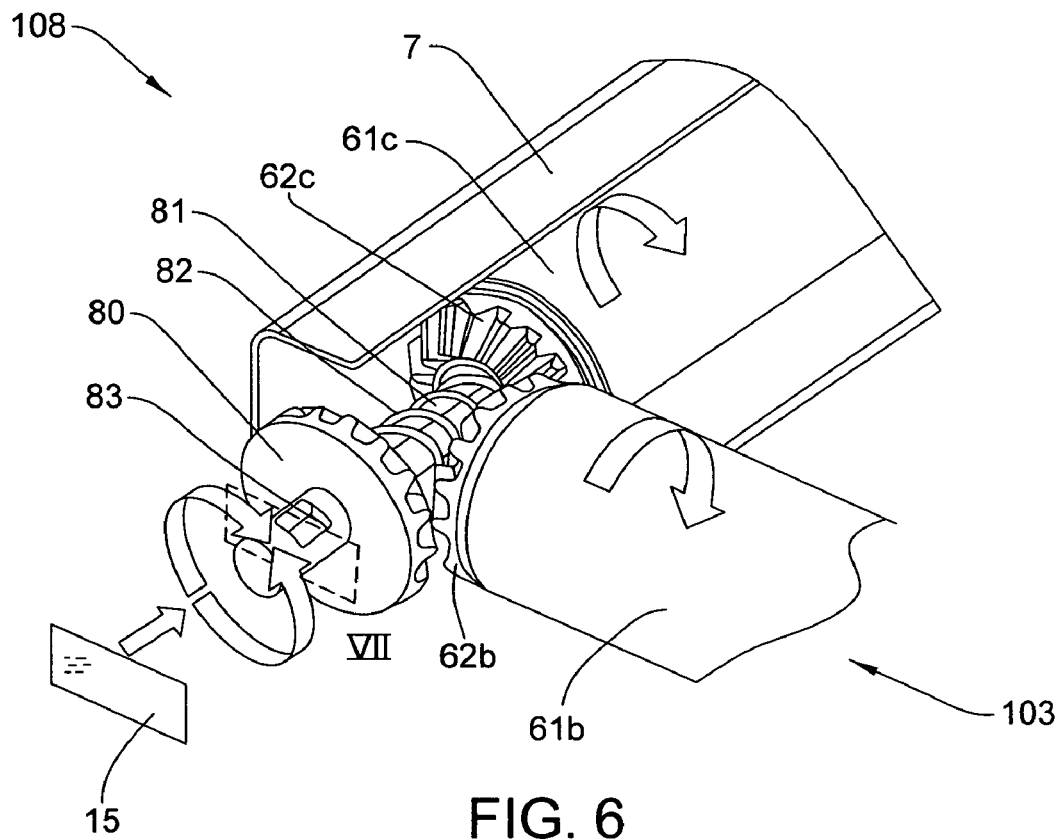
FIG. 6 shows the detail V according to FIG. 3b of a device according to a second embodiment of the invention.
Figure 7:
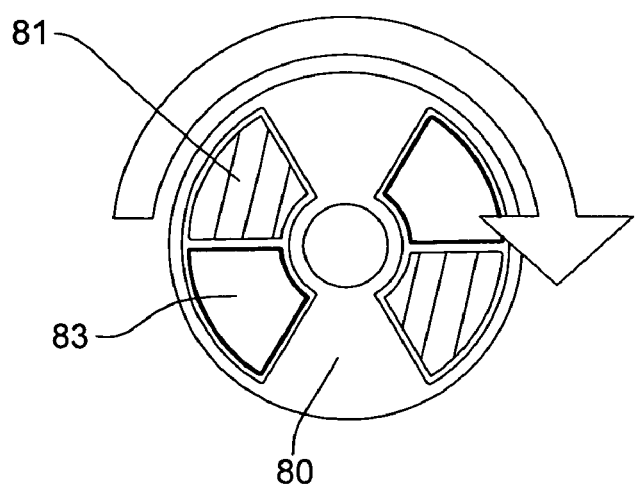
FIG. 7 shows a sectional view through a plane VII according to FIG. 6.

FIG. 6 shows the detail according to FIG. 5 of a device 103 according to the invention in which an alternative securing device 108, which corresponds essentially to the securing device 8 according to FIG. 5, is provided. Uniform reference symbols are used for identical components here, and these components are not described. In contrast to the securing device 8 according to FIG. 5, in the case of the securing device 108 according to FIG. 6 a damping element is arranged between the beveled ratchet wheel 80 and the beveled wheel 62c. In the illustrated embodiment, the shaft 81 is permanently connected to the beveled wheel 62c of the winding shaft 61c, with the beveled ratchet wheel 80 being mounted in an axially displaceable fashion on the shaft 81. FIG. 7 is a schematic view of a section through a plane VII according to FIG. 6. As can be seen in FIG. 7, the beveled ratchet wheel 80 and the shaft 81 are coupled in order to transmit rotation by means of stops which are teethed with one another. In order to cushion load peaks, i.e. in order to prevent high forces being transmitted to the device via the beveled ratchet wheel 80, in the exemplary embodiment illustrated in FIGS. 6 and 7 rubber dampers 83 are arranged between the beveled ratchet wheel 80 and the shaft 81. However, the connection between the beveled ratchet wheel 80 and the beveled wheel 62c remains fixed in terms of rotation here in the sense of the invention, i.e. a rotation is transmitted from the beveled wheel 62c to the beveled ratchet wheel 80 and vice versa.

Figure 8:
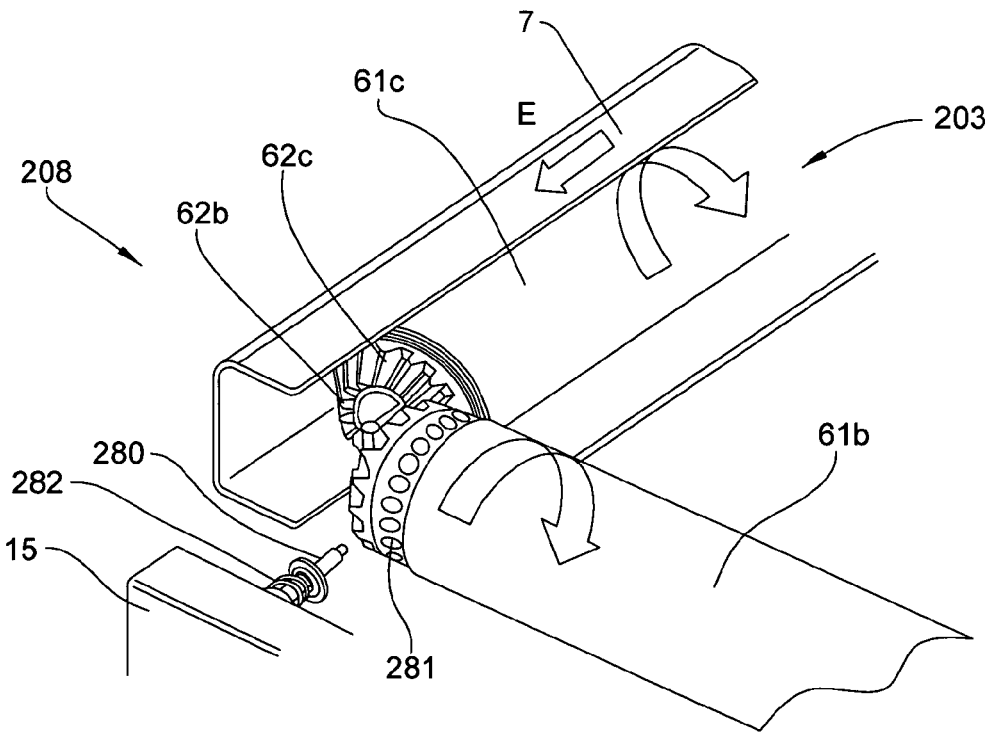
FIG. 8 shows the detail V according to FIG. 3b of a device according to a third embodiment of the invention.

FIG. 8 shows the detail V according to FIG. 3b in a further embodiment of a device 203 according to the invention with a securing device 208. For components which correspond to the components according to FIGS. 5 and 6, the same reference symbols are used here, and these components are not described. In contrast to the embodiment according to FIGS. 5 and 6, in the embodiment according to FIG. 8 a pitch circle 281 is provided between the winding shaft 61b arranged transversely in the direction of the vehicle and the associated beveled wheel 62c. The securing device 208 comprises an arbor 280, which is introduced into a hole in the pitch circle when the storage container 2 is displaced in a pushing in direction E. In the illustrated embodiment, the arbor 280 is mounted so as to be axially displaceable on a vehicle wall 15. If the arbor 280 does not meet a hole in the pitch circle 281 when the storage container 2 is displaced, the arbor is pressed in the direction of the vehicle wall 15. If the winding shaft 61b rotates and therefore the pitch circle 281 which is permanently connected to the latter rotates owing to a shock, the arbor latches into the next possible or adjacent hole in the pitch circle 281 owing to a force of the spring 282. As a result, rotation of the winding shaft 61b and therefore also of a winding shaft 61c which is connected to the latter by means of the beveled wheels 62b, 62c is prevented. In order to avoid transmitting load peaks, the arbor 280 can be formed at least partially from a damping material. In addition, it is conceivable to mount the arbor 280 on the vehicle wall 15 by means of a damping element (not illustrated). In another refinement, the device 203 is mounted in the motor vehicle in a non-displaceable fashion. In this context it is possible to provide that the arbor 282 is provided on a pivotable rear tray 113 according to FIGS. 2a and 2b and engages in the pitch circle 281 during the pivoting process.

Figure 9:
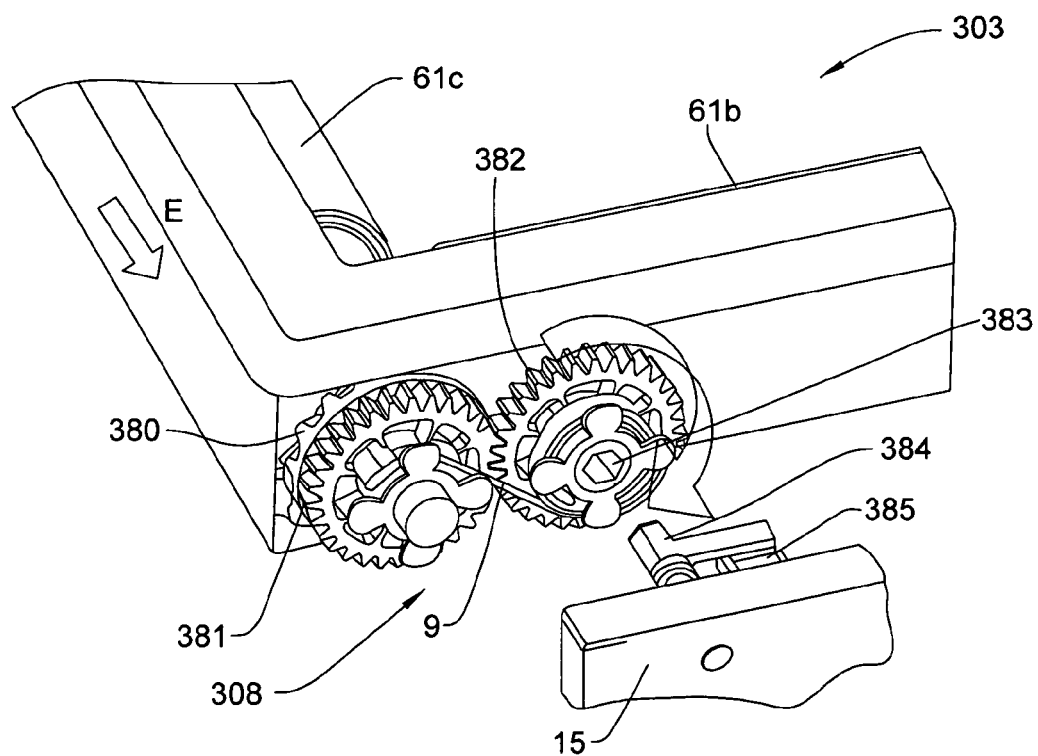
FIG. 9 shows the detail V according to FIG. 3b of a device according to a fourth embodiment of the invention.

FIG. 9 shows the detail V according to FIG. 3b of a further exemplary embodiment of the device 303 according to the invention, in which case uniform reference symbols are used for identical components. The device 303 according to FIG. 9 has a securing device 308 which comprises a beveled ratchet wheel 380 which is connected to a gearwheel 381 in a rotationally fixed and coaxial fashion. The gearwheel 381 meshes with a second gearwheel 382, in which case the gearwheels 381 and 382 are rotateably mounted on an outer side of the frame 7. The gearwheel 382 has a cutout 383 with a contour which is not rotationally symmetrical. When the storage container 2 is pushed in in a pushing in direction E, an arbor 384, which is mounted on a vehicle wall 15, engages in the cutout 383. The arbor is mounted in an essentially rotationally fixed fashion on the vehicle wall 15 by means of a rubber damper 385, with the result that a rotational movement of the winding shaft 61c and therefore also of the winding shaft 61b which is connected thereto is prevented by the insertion of the arbor 384. The rubber damper 385 permits the load peak to be cushioned, in which case, in order to cushion the load peaks, the arbor 384 moves against the rubber damper 385. For this purpose, in the illustrated exemplary embodiment the arbor 384 is configured with an extension arm. However, other embodiments are also conceivable.

The two gearwheels 381, 382 are also connected to one another by means of a belt 9. The belt 9 acts as an extension-limiting means. The gearwheels 381, 382 are connected to one another by means of a belt, in the illustrated example a flat belt, in such a way that depending on the rotational direction the belt 9 is unwound from one of the gearwheels and wound onto the other gearwheel. In the illustrated exemplary embodiment, a roller blind is unwound from the winding shaft 61c by rotating the winding shaft in the clockwise direction. The winding shaft 61c is connected in a rotationally fixed fashion to a beveled wheel (not illustrated). Said beveled wheel interacts with a beveled wheel (likewise not illustrated in FIG. 9) of the winding shaft 61b. The movement of the beveled wheel of the winding shaft 61b is transmitted to the beveled ratchet wheel 380 and therefore to the gearwheel 381, with the result that the gearwheel 381 is rotated in the counterclockwise direction in order to unwind a side wall or roller blind which is wound onto the winding shaft 61c. The gearwheel 382 which is connected to the gearwheel 381 in an intermeshing fashion rotates in the clockwise direction, as illustrated by an arrow. In this case, the belt 9 is unwound from a holder on the gearwheel 382 and wound onto a corresponding receptacle on the gearwheel 381. As soon as the entire belt 9 is unwound from the gearwheel 382, a further movement of the gearwheels in the direction illustrated by the arrow is blocked. As a result, movement of the winding shaft 61c in an unwinding direction, i.e. in the clockwise direction in the illustrated exemplary embodiment, is also blocked. The length of the belt 9 therefore determines not only a diameter of the gearwheels and/or a winding radius for the belt 9 but also a maximum extension movement of the winding shaft 61c. As a result, it is possible, for example, that an extension movement of a roller blind which is wound onto the winding shaft 61c, or of a side wall, is limited in such a way that at least one securing loop of the roller blind or of the side wall is always present on the winding shaft 61c. The roller blind or side wall can be attached here to the winding shaft 61c, for example by bonding or the like. In one advantageous refinement of the invention, the belt 9 is fabricated at least partially from an elastically damping material with the result that even when the roller blind is unwound quickly from the winding shaft 61c the forces can be damped at the stop. If the winding shaft 61c is moved, for example, owing to the force of a winding spring (not illustrated) or the like, in such a way that the roller blind or side wall is wound onto the winding shaft 61c again, the flat belt 9 can be selected in such a way that impacting during the winding on of the roller blind or side wall is also damped.

Figure 10:
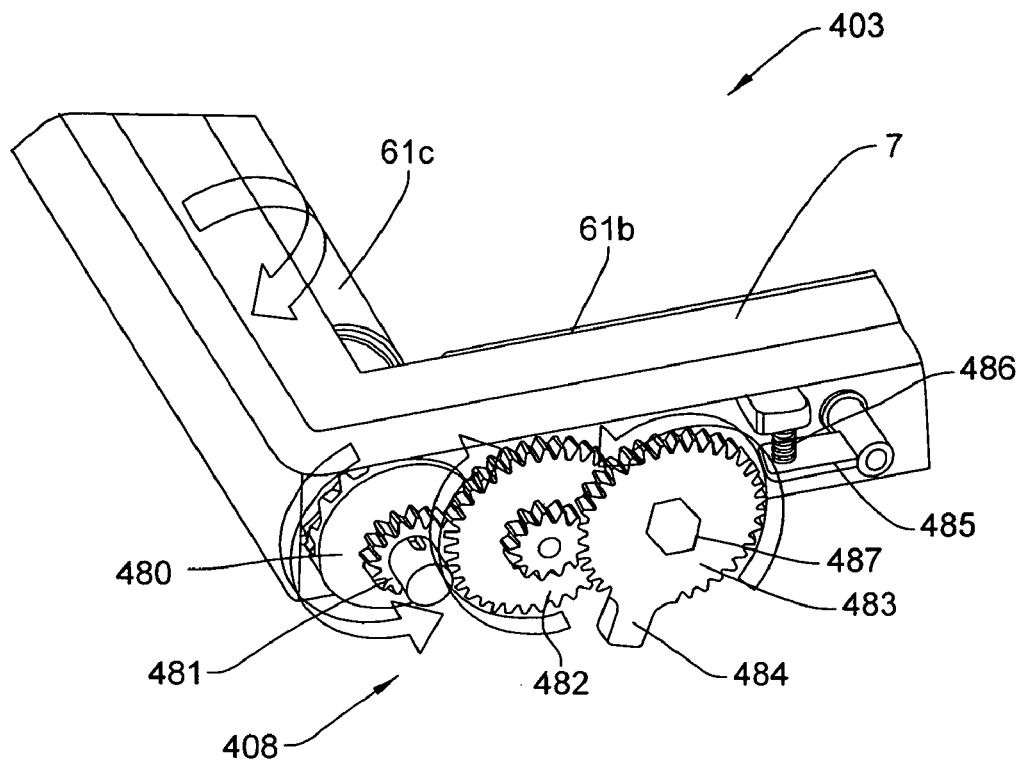
FIG. 10 shows the detail V according to FIG. 3b of a device according to a fifth embodiment of the invention.

FIG. 10 shows the detail V according to FIG. 3b of a further device 403 according to the invention. The device 403 comprises a securing and extension-limiting device 408 with a beveled ratchet wheel 480 which by means of beveled wheels (not illustrated) of the winding shafts 61b, 61c is synchronized with said winding shafts 61b, 61c, with the result that, as illustrated, the beveled ratchet wheel 480 is rotated in the counterclockwise direction when the winding shaft 61c rotates in the clockwise direction. The beveled ratchet wheel 480 is connected in a coaxial and rotationally fixed fashion to a gearwheel 481 which meshes with a larger crown gear of a double gearwheel 482. A smaller gearwheel of the double gearwheel 482 meshes with a third gearwheel 483. The gearwheel 483 therefore rotates in the same direction as the first gearwheel 481 which is connected to the beveled ratchet wheel 480, but, owing to the double transmission ratio, a rotational speed of the third gearwheel 483 is significantly lower than a rotational speed of the first gearwheel 481. The third gearwheel 483 has a lever element 484 which extends in the radial direction and in the event of a rotation of the gearwheel 483 said lever element 484 impacts against a stop 485 which is connected to the frame 7, with the result that a rotational movement of the third gearwheel 483 is limited. This rotation-limiting means acts via the gearwheels 483, 482, 481 on the beveled ratchet wheel 480 and therefore on the winding shafts 61b, 61c. In order to avoid high forces when the stop 485 is reached, the stop 485 is connected via a spring 486 to the frame 7 through which the forces are absorbed when the stop is reached. A rotational movement counter to the directions illustrated by the arrows is limited by collision of the lever 484 with the smaller gearwheel of the double gearwheel 482. In this context, in certain refinements a damping layer composed of a rubber, silicone or the like is applied to the lever 448. In other refinements, a maximum unwinding length of the side walls from the winding shafts 61b, 61c is selected in such a way that there is no contact between the stop 484 and the gearwheel 482. In the illustrated exemplary embodiment, the third gearwheel 483 has a non-rotationally symmetrical cutout 487 into which, for example, an arbor according to FIG. 9 for locking transportation can engage. In addition, it is also conceivable to make means for locking transportation independent of the extension-limiting device.

Figure 11:
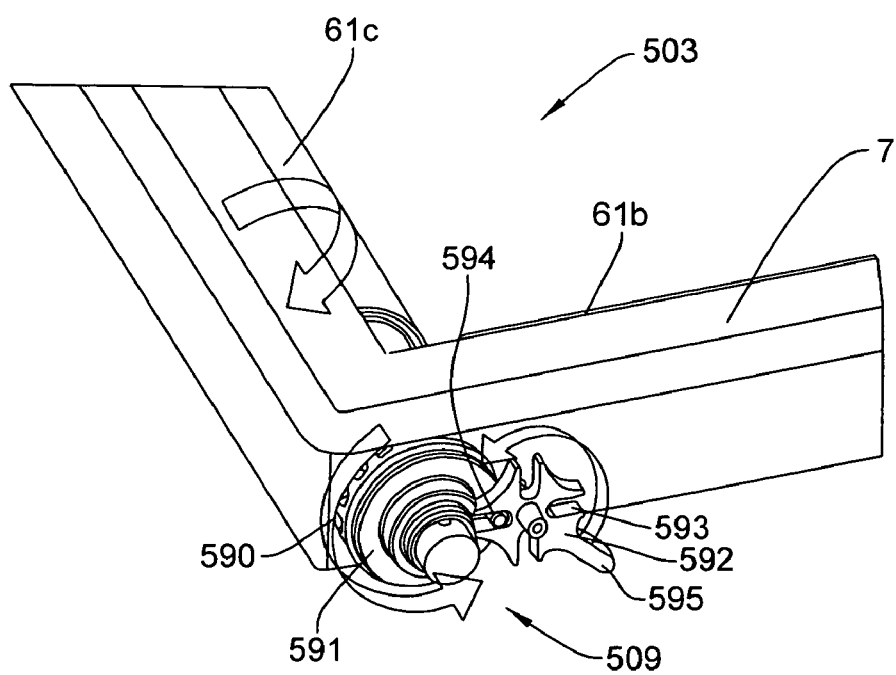
FIG. 11 shows the detail V according to FIG. 3b of a device according to a sixth embodiment of the invention.

FIG. 11 shows a detail V according to FIG. 3b of a device 503 according to the invention in accordance with a further exemplary embodiment of the invention with an extension-limiting device 509. The extension-limiting device 509 comprises a beveled ratchet wheel 590 which meshes with a complementary beveled wheel (not illustrated) of the winding shaft 61b. The beveled ratchet wheel 590 is connected in a rotationally fixed fashion to a plate 591 of a Maltese cross transmission or is embodied in one part therewith. The Maltese cross transmission comprises both the plate 591 and a Maltese cross-shaped component 592 with four slots 593. A spigot 594, which engages in a slot 593 of the Maltese cross-shaped component 592 during a rotation of the plate 591 and therefore entrains said component 592 until the spigot 594 emerges from the slot 593 again is arranged on the plate 591. A continuous rotational movement of the plate is therefore transmitted to an intermittent rotational movement of the Maltese cross-shaped component 592. Furthermore, a stop 595, which extends in the radial direction, is provided on the illustrated Maltese cross-shaped component 592. Rotational movement of the plate 591 in contact is blocked by the stop 595. As a result, the beveled ratchet wheel 590 which is arranged so as to be rotationally fixed to the plate 591 blocks a rotational movement of the winding shafts 61b, 61c with the result that unwinding of a side wall or roller blind from the winding shafts 61b, 61c and/or winding thereof onto the winding shafts 61b, 61c is limited. The illustrated extension-limiting device 509 is not formed in common with a transportation-securing device here. However, in other refinements of the invention there is provision for the extension-limiting device 509 to be combined with a transportation-securing device, for example by means of a non-rotationally symmetrical cutout on the plate 591 into which a corresponding arbor can engage.

Figure 12:
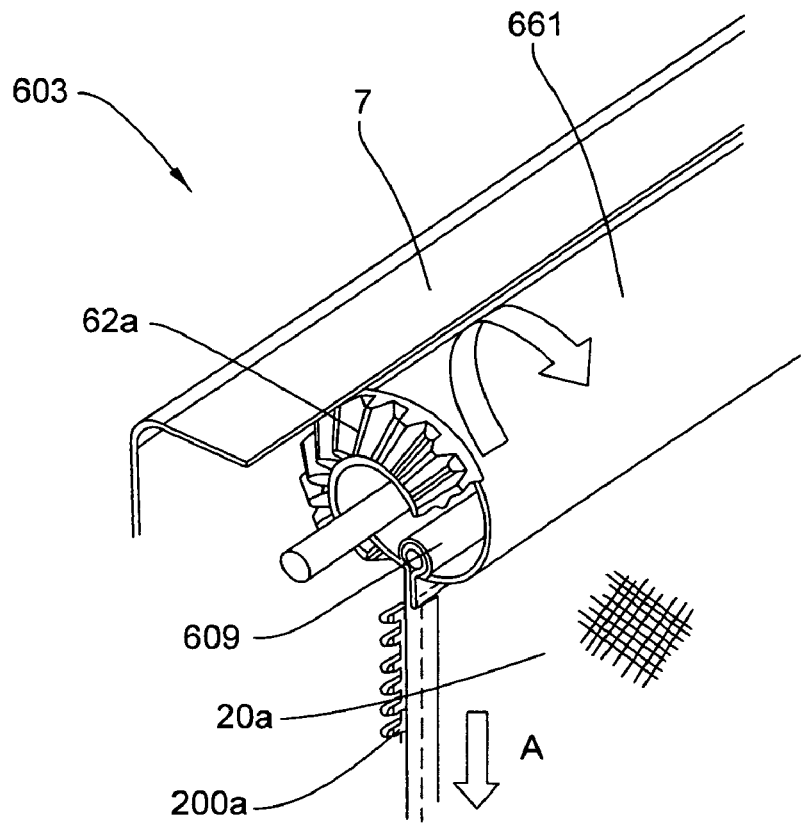
FIG. 12 shows a connection of a flexible surface structure to a winding shaft of a device according to the invention according to a further exemplary embodiment of the invention.

FIG. 12 shows part of a winding shaft 661 of a device 603 according to the invention in accordance with a further exemplary embodiment of the invention. The winding shaft 661 is mounted here in a frame 7. A side wall 20a which is configured as a flexible surface structure is provided on the winding shaft 661 in such a way that it can be wound on and unwound, in which case the winding shaft 661 is embodied as an Ω pipe on which the side wall 20a can be attached as illustrated by means of beading 609. In order to drive the winding shaft 661, the latter is embodied with a beveled wheel 62a. The illustrated side wall 20a has, on the edge, cramps 200a of a zip fastener which is described below in detail with reference to FIGS. 13 and 14.

If the storage container comprises, as illustrated for example in FIG. 3b, four side walls 20a to 20d, in one advantageous refinement a closure device, for example a zip fastener, is provided in order to connect the side walls 20a to 20d to one another as they unroll from the respective winding shafts 61a, 61b. However, the connection is detachable in order to make it possible, as the volume of the storage compartment is reduced, for the side walls 20a to 20d to be wound independently of one another onto the respective winding shaft 61a, 61b, 61c, 61d. A zip fastener has proven an advantageous closure device here.

Figure 13:
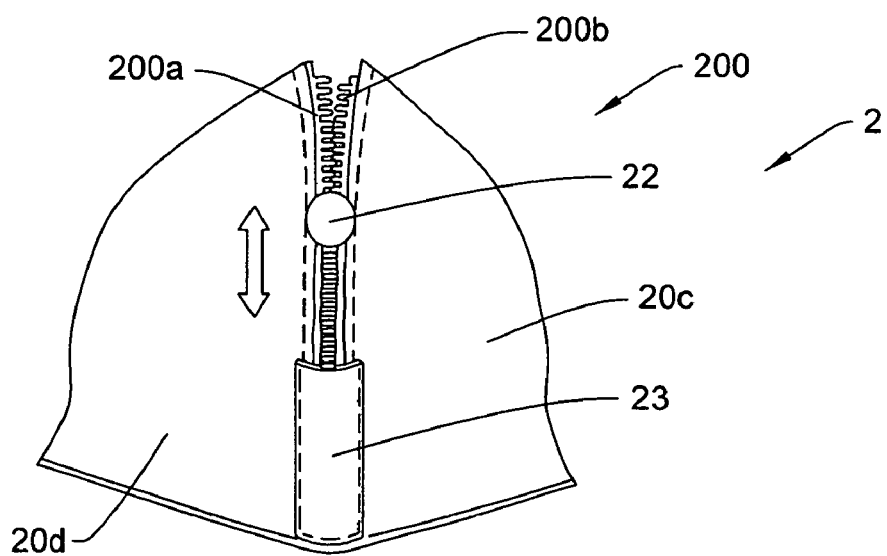
FIG. 13 shows a detail XIII of the device according to FIG. 3b.

FIG. 13 shows a detail XIII according to FIG. 3b in an enlarged illustration. In FIG. 13, it is possible here to see the side walls 20c, 20d which have cramps 200a, 200b of a zip fastener 200, which cramps 200a, 200b can be connected to one another and disconnected from one another by means of a carriage or slide 22. A stopper 23 is attached to a floor area of the container 2. The stopper 23 is composed, for example, of a textile, in which case a corner of the container 2 has a strip of material sewn over it in order to attach the stopper 23. The carriage or slide 22 impacts against the stopper 23 which prevents the zip fastener 200 from opening further and the cramps 200a, 200b from moving apart.

Figure 14:
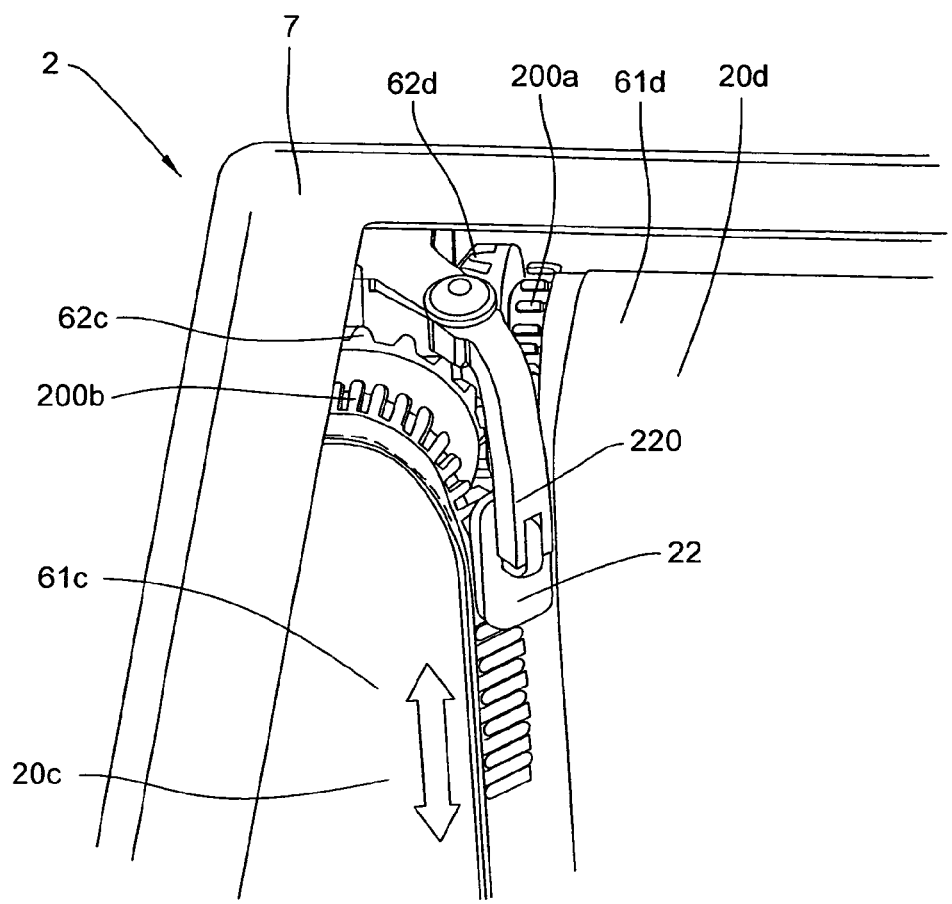
FIG. 14 shows a detail XIV of the device according to FIG. 3b.
Figure 15A:
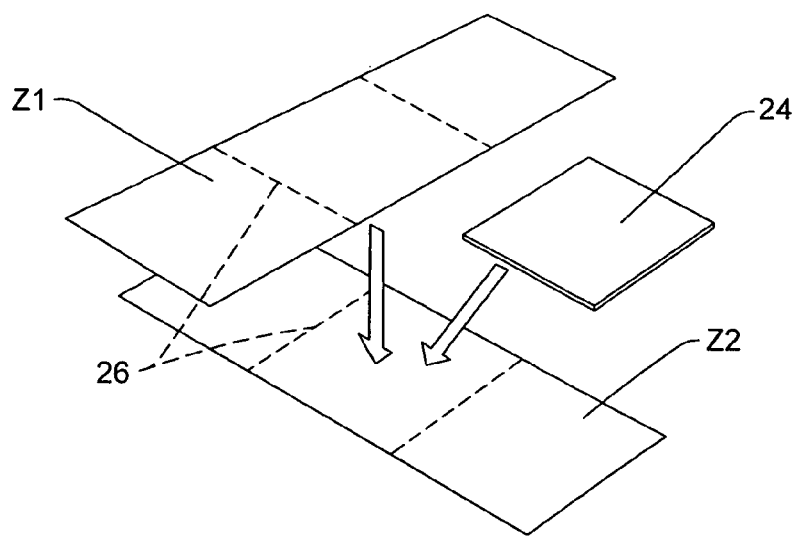
FIGS. 15a to 15e show blanks for a wall of a container of a device according to the invention.
Figure 15B:
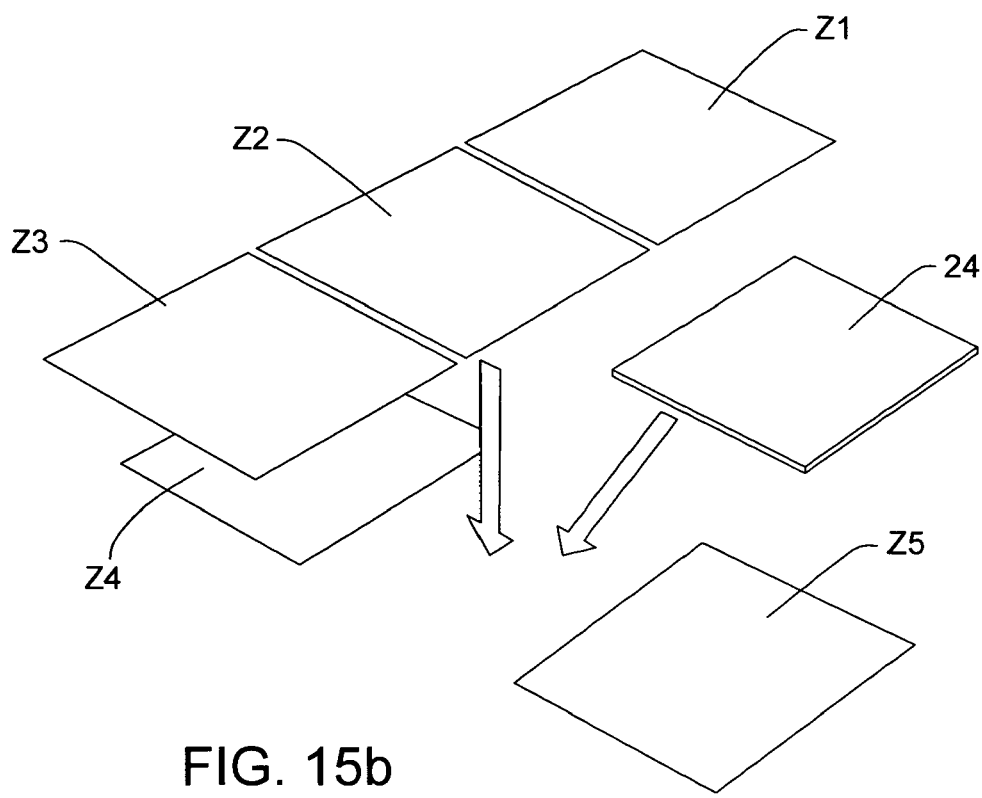
Figure 15C:
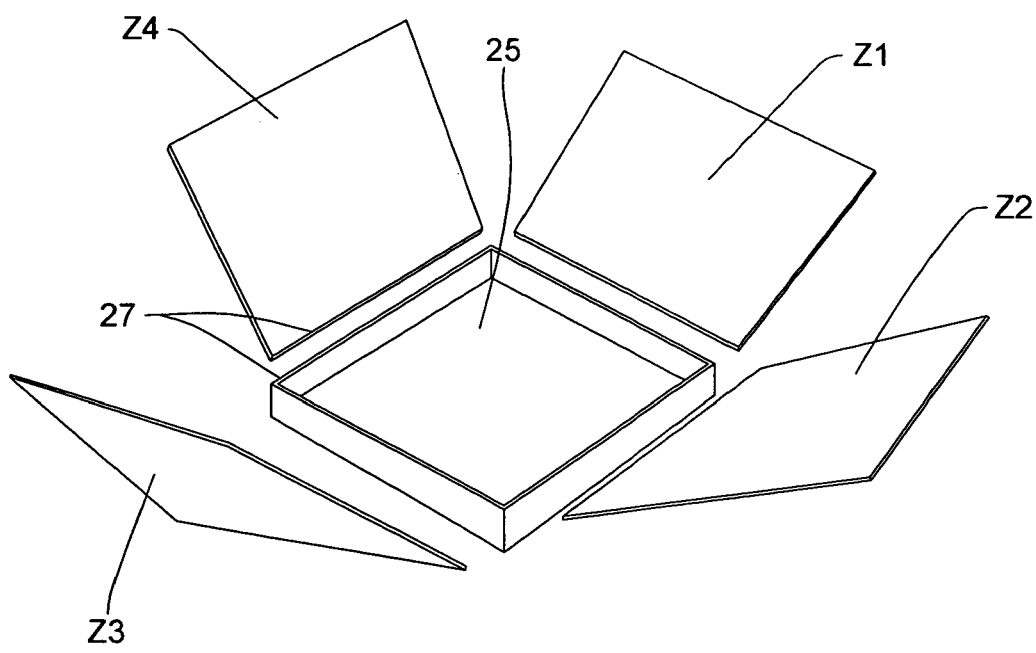
Figure 15D:
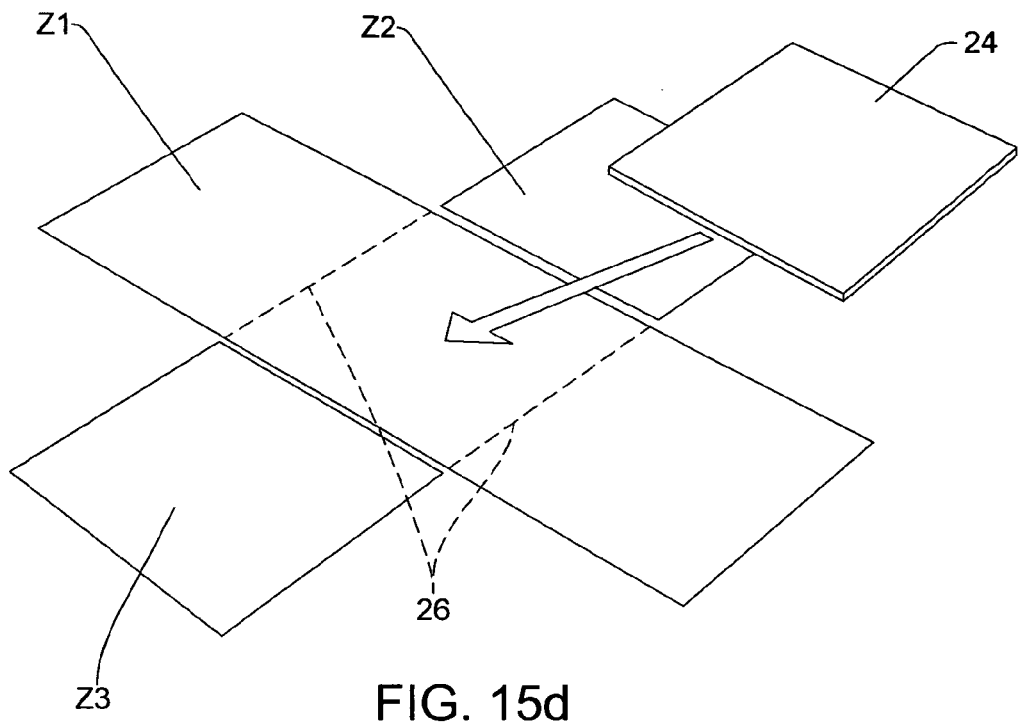
Figure 15E:
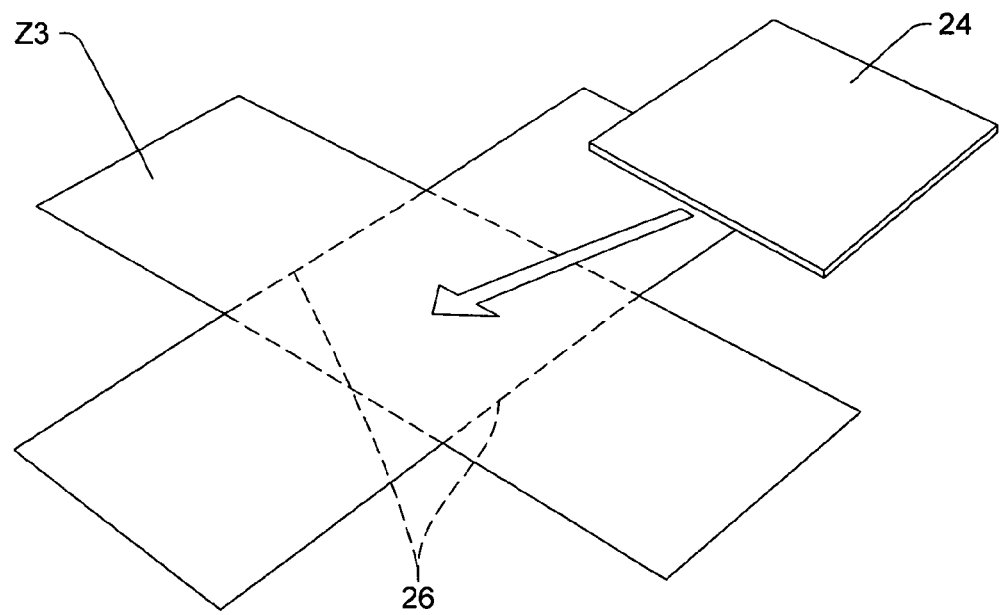

FIG. 14 shows a detail XIV according to FIG. 3b of a storage container 2. FIG. 14 shows, in certain sections, the side walls 20c, 20d which are arranged in such a way that they can be wound onto and unwound from the associated winding shafts 61c, 61d. The side walls 20c, 20d have, at each of their edges, cramps 200a, 200b which can be connected to one another by means of the carriage 22. The carriage 22 is connected to the frame 7 by means of a carriage or zipper holder 220. In order to allow for the fact that the diameter of the winding shafts 61c, 61d, including the wound-on side walls 20c, 20d, is enlarged when the side walls 20c and 20d are wound on, the illustrated zipper holder 220 is configured from a flexible material, for example from plastic or as a wire hoop. Alternatively or additionally it is possible to mount the zipper holder 220 in a pivotable fashion on the frame 7. As can be seen further in FIG. 14, the winding shafts 61c, 61d are synchronized with one another by means of associated beveled wheels 62c, 62d.

The wall 20 of the container 2 which is illustrated in FIGS. 1 to 14 is configured from a flexible surface structure, for example from a piece of cloth, a plastic film, a mesh or the like. FIGS. 15a to 15e show various blanks of the flexible surface structure for a storage container 2 with four side walls and with an essentially square base surface. The illustrated embodiments are merely exemplary. In particular, another blank may also be advantageous depending on a base surface.

The blank components are designated by Z1 to Z5 in FIGS. 15a to 15e. The container can also comprise a floor reinforcement 24 or a floor shell 25 which can be connected to the blank components Z1 to Z5. The individual blank components can be connected to one another, in particular welded, bonded and/or sewn to one another, by means of folding and/or sewn sections 26. In addition, it is conceivable, as illustrated for example in FIG. 15c, to connect the blank components to the floor shell 25 by means of beading 27. In the embodiment according to FIG. 15a, the floor reinforcement 24 is integrated between the blank components Z1, Z2. In contrast, in the embodiments according to FIGS. 15b, 15d and 15e, the floor reinforcement 24 can be removed.

Figure 16:
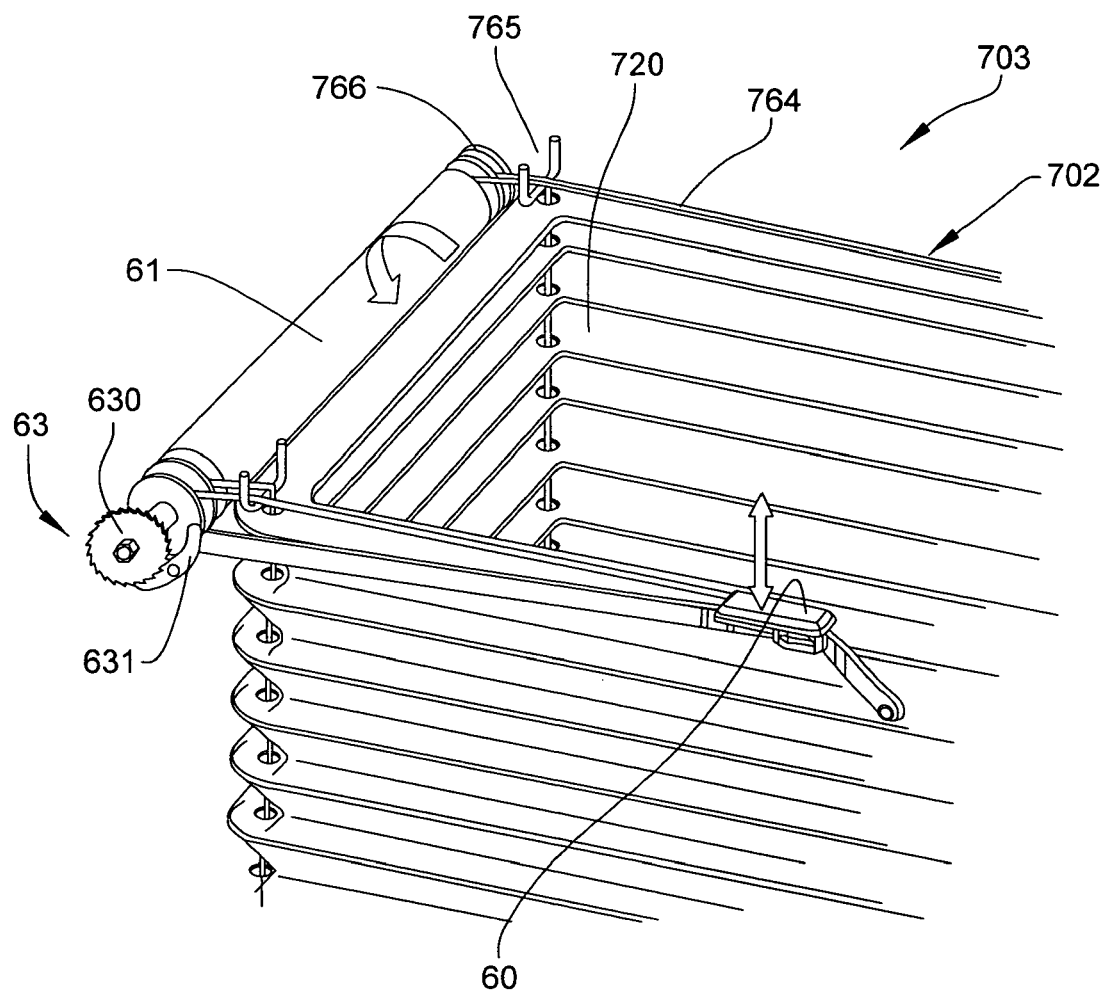
FIG. 16 shows a partial view of a device according to the invention according to a further exemplary embodiment with a folding bellows.

FIG. 16 is a schematic view of a container 702 of a device 703 according to the invention in accordance with a further exemplary embodiment of the invention. The container 702 has a wall 720 which can fold in the manner of a harmonica and which has, in the illustrated exemplary embodiment, an essentially rectangular outline and is embodied so that it runs all around. The device 703 also has two winding shafts 61, but only one of these can be seen in FIG. 16. Belts 764, which are guided in the four corners by the wall 720 are attached to a floor surface (not visible) of the container 702. The belts 764 can be wound onto reels 766 of the winding shafts 61 by means of deflection hoops 765 and unwound therefrom. In this context, the four belts 764 which are provided at the four corners can be wound on and unwound synchronously with the result that a floor (not visible) of the storage container 702 is displaced essentially in parallel. Synchronization of the winding shafts 61 is carried out, for example, by means of a strap (not illustrated).

In addition, it is, however, also conceivable to adjust each of the belts 764 individually in order to bring about an oblique position of the floor (not illustrated). For this purpose, for example friction clutches can be provided so that the belts 764 can be wound on and unwound independently of one another.

The winding shaft 61 preferably comprises a winding spring (not visible), in which case the belts 764 for enlarging the volume of the storage container 702 are unwound from the winding shaft 762 counter to the force of the winding spring. The locking mechanism 63 with the gearwheel 630 and the detent pawl 631 can block a rotational movement of the winding shaft 61 and therefore a winding of the belts 764 in order to reduce the volume of the storage compartment of the container 701. The detent pawl 631 can, as already illustrated in FIG. 3b, be operated by means of a pushbutton 60 in order to release it.

Figure 17:
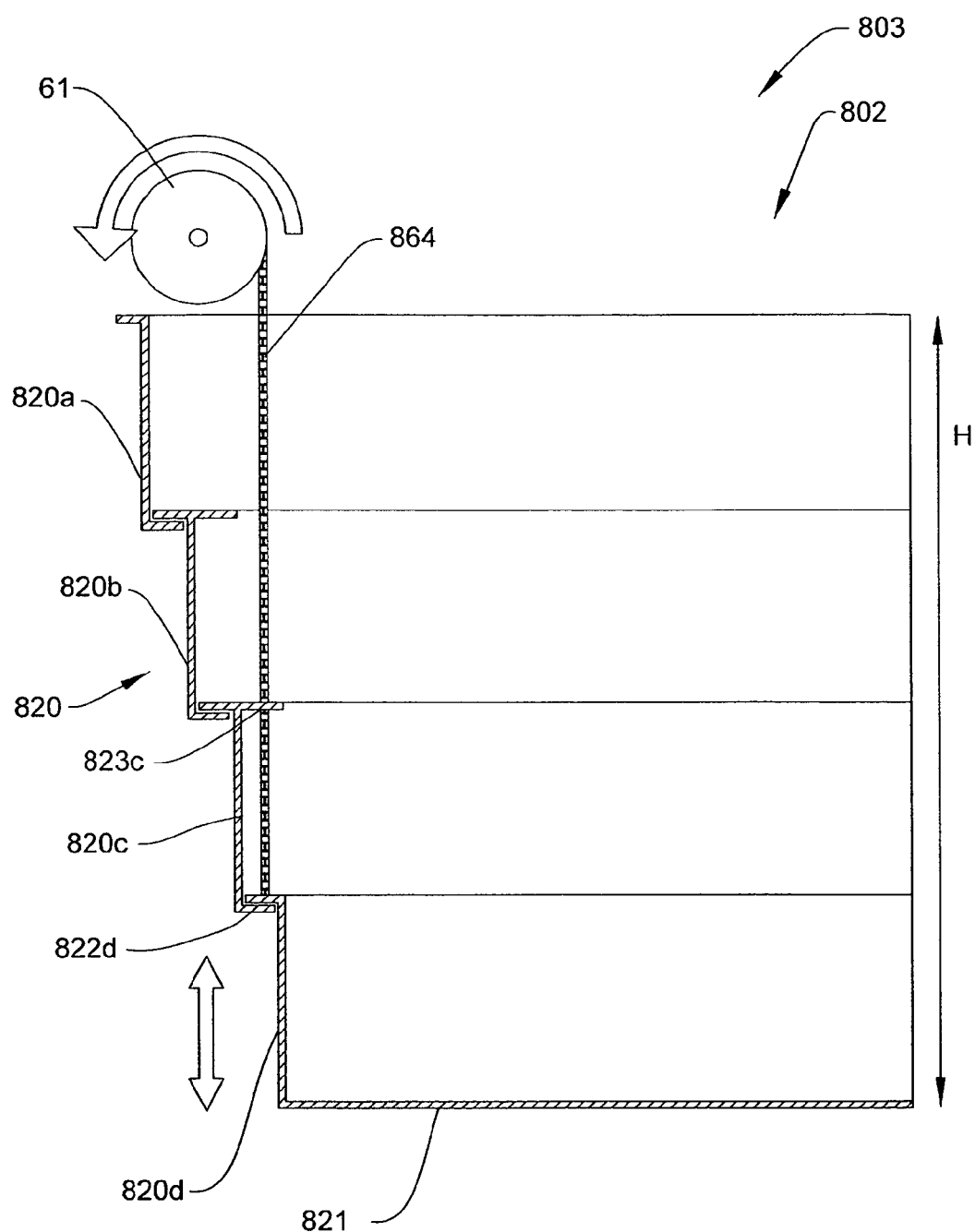
FIG. 17 shows a partial view of a device according to the invention in accordance with a further exemplary embodiment with a telescopic wall.

FIG. 17 shows a further embodiment of a device 803 according to the invention with a container 802 which has a telescopic wall 820. The wall 820 comprises a number of lamella hard shells 820a to 820d, and in the illustrated example four lamella hard shells 820a to 820d are provided. The lamella hard shells 820a to 820d can be stacked one in the other in order to reduce the volume of a storage compartment. The lowest lamella hard shell 820d is formed in one piece with a floor 821. The illustrated lamella hard shells 820a to 820d each have an essentially rectangular base surface. However, other configurations, for example with a circular base surface, are also conceivable. Belts 864, which can be wound onto and unwound from winding shafts 61 are provided at the four corners on the lowest lamella hard shell 820d. The adjustment device preferably comprises two winding shafts 61 here, but in the illustration only one winding shaft 61 can be seen. The winding shafts 61 are preferably synchronized with one another. Synchronization is possible, for example, by means of a linkage or by means of a central belt. A height H of the wall 820 is dependent on the free length of the belts 864. In the illustrated state, the wall 820 has a maximum height H. By winding the belts 864 onto the winding shafts 61, the free length of the belts 864 is shortened and the lowest lamella hard shell 820d is displaced in the direction of the winding shaft 61 with the result that the height H is reduced. As soon as a projection 822d which is provided on the hard shell 820d and points outward impacts against a corresponding, inwardly pointing projection 823c of the hard shell 820c, the movement is also transported further onto this hard shell 820c.

The belts 864 and/or 764 according to FIGS. 16 and 17 can, in another refinement, be locked at least partially according to the roller blind principle, for example with a drum brake. In such a principle it would also be conceivable to move the individual belts 764 and 864 independently of one another in order to move the floor into a slanting position and prevent objects from moving in an uncontrolled way.

The illustrated, essentially mechanical adjustment devices can be coupled to electronic components, for example for the purpose of moving the winding shafts, for locking the storage container, displaying an overload or the like.

In the illustrated embodiments, the winding shafts are mounted by means of a frame 7, in which case the frame 7 also serves to connect to the motor vehicle. In other refinements, the winding shafts themselves at least to a certain extent form a frame for connection to the motor vehicle.

The invention claimed is:

1. Device for storing objects in a loading space of a motor vehicle comprising:
    a storage container attachable to a loading space of a motor vehicle, the storage container having supporting surface and a wall surrounding the supporting surface such that the supporting surface defines a bottom of the storage container, the supporting surface and the wall together defining a storage space for storing objects, the wall being deformable at least partially elastically and/or inelastically,
    an adjustment device for changing the volume of the storage space by changing a height of the wall at least in certain sections, the adjustment device comprising at least one winding shaft and at least one detachable securing device, whereby a rotational movement of the at least one winding shaft can be locked by the securing device for the purpose of transportation, lengthening of the wall being prevented during transportation by preventing rotational movement of the at least one winding shaft.

2. Device according to claim 1, wherein the securing device comprises at least one damping element for cushioning load peaks.

3. Device according to claim 1, wherein the securing device comprises a first beveled ratchet wheel which engages a complementary second beveled wheel arranged in a rotationally fixed fashion on the winding shaft, in order to block the rotational movement of the winding shaft.

4. Device according to claim 3, wherein the winding shaft is a first winding shaft and the first beveled ratchet wheel is arranged in an essentially rotationally fixed and axially displaceable fashion on a second winding shaft opposite the second beveled wheel connected in a rotationally fixed fashion to the first winding shaft.

5. Device according to claim 4, further comprising a damping element arranged between the second beveled ratchet wheel and the first beveled wheel.

6. Device according to claim 1, wherein the securing device comprises an arbor mounted on a vehicle in an essentially rotationally fixed fashion and disposed to be introduced into a pitch circle arranged in a rotationally fixed fashion on the winding shaft, in order to block the rotational movement of the winding shaft.

7. Device according to claim 1, wherein the securing device comprises an arbor which is mounted on a vehicle in an essentially rotationally fixed fashion and has an at least partially non-rotationally symmetrical outer contour, the arbor being disposed to be introduced into a complementary cutout on the winding shaft and extending in the axial direction, in order to block the rotational movement of the winding shaft.

8. Device according to claim 6, wherein the arbor is mounted to the vehicle by an arbor mount, the arbor mount comprising a damping element.

9. Device according to claim 1, wherein the storage container is capable of being mounted in such a way that the storage container is displaced along a plane in a longitudinal direction of the vehicle and the bottom of the storage container is essentially parallel to a floor of the vehicle, wherein by arranging the storage container into a storage position the winding shaft is blocked by the securing device.

10. Device according to claim 1, wherein the adjustment device comprises an extension-limiting device for limiting a maximum extension movement of the at least one winding shaft.

11. Device according to claim 1, wherein the winding shaft has a winding spring, the wall being lengthened counter to the force of the winding spring.

12. Device according to claim 11, further comprising a brake device disposed to act counter to a force of the winding spring for braking a rotational movement of the winding shaft.

13. Device according to claim 12, wherein the brake device comprises a loop brake and/or a ratchet drive.

14. Device according to claim 1, wherein the wall comprises at least one deformable surface structure arranged on the winding shaft in such a way that the surface structure can be wound and unwound.

15. Device according to claim 14, wherein the surface structure is connected to the winding shaft by beading.

16. Device according to claim 14, comprising at least two synchronized winding shafts arranged at right angles to one another and at least two deformable surface structures, each of the surface structures capable of being wound onto and unwound from a said winding shaft.

17. Device according to claim 16, wherein the surface structures adjoin one another and are capable of being connected to one another by a re-closeable and re-openable closing element, the closing element being closable when the surface structures are unwound.

18. Device according to claim 17, further comprising a stopper for limiting the opening movement of the closing element.

19. Device according to claim 16, wherein the closing element is a zip fastener, the device further comprising a holder for a zipper of the zip fastener, the holder being made of a flexible plastic or a wire hoop.

20. Device according to claim 1, wherein the wall is configured to be foldable, the device further comprising a mechanism for folding the wall, the mechanism comprising at least one linear element mounted on the winding shaft.

21. Device according to claim 1, wherein the wall comprises at least two hard shells stackable one in the other, the device further comprising a stacking mechanism for stacking the hard shells one in the other and comprising at least one linear element mounted on the winding shaft.

22. Device according to claim 1, wherein a frame of the storage container is formed at least partially by the winding shaft.

23. Device for storing objects in a loading space of a motor vehicle comprising:
a storage container attachable to a loading space of a motor vehicle, the storage container having a supporting surface with a periphery and a deformable wall connected to and extending around the periphery of the supporting surface; and an adjustment device for changing the volume of the storage container by changing the height of the wall at least in certain sections relative to the supporting surface, the adjustment device comprising at least one winding shaft, and an extension-limiting device for limiting a maximum extension of the wall by restricting movement of the at least one winding shaft.

24. Device according to claim 23, wherein the extension-limiting device comprises at least two gearwheels connected to one another by an elongate member such that the maximum extension movement is determined by the length of the elongate member.

25. Device according to claim 23, wherein the extension-limiting device comprises a transmission having at least two gearwheels, a rotational angle of at least one gearwheel being limited by a stop.

26. Device according to claim 23, wherein the extension-limiting device comprises a Maltese cross transmission having a spigot.

27. An apparatus for storing objects in a loading space of a vehicle, the apparatus comprising:
a storage container configured to be attached to a loading space of a vehicle, the storage container having a bottom support wall defining an object-supporting surface and a side wall structure having a height relative to the bottom support wall and fixed to and extending upwardly from the bottom support wall, the side wall structure wholly surrounding at least a portion of the object-supporting surface of the bottom support wall so as to define a storage space for storing objects; and
an adjustment device connected to the storage container, the adjustment device comprising a winding member disposed to change the height of the side wall structure relative to the bottom support wall to thereby change a volume of the storage space.

28. The apparatus of claim 27, wherein the adjustment device further comprises a securing device attached to the winding member to prevent unwanted height adjustment of the side wall structure relative to the bottom support wall during transportation.

* * * * *